United States Patent
Luo et al.

(10) Patent No.: US 10,169,453 B2
(45) Date of Patent: Jan. 1, 2019

(54) AUTOMATIC DOCUMENT SUMMARIZATION USING SEARCH ENGINE INTELLIGENCE

(71) Applicant: Microsoft Technology Licensing, LLC, Redmond, WA (US)

(72) Inventors: Gang Luo, Sunnyvale, CA (US); Qi Liu, Santa Clara, CA (US); Krishna Sravanthi Rajanala Sai, Cupertino, CA (US); Dario Bigongiari, Mountain View, CA (US); Qifa Ke, Cupertino, CA (US); Oana Diana Nicolov, Sunnyvale, CA (US); Srinivas Vadrevu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/082,052

(22) Filed: Mar. 28, 2016

(65) Prior Publication Data

US 2017/0277668 A1    Sep. 28, 2017

(51) Int. Cl.
G06F 17/24      (2006.01)
G06F 17/27      (2006.01)
G06F 17/30      (2006.01)

(52) U.S. Cl.
CPC .............................. *G06F 17/30719* (2013.01)

(58) Field of Classification Search
CPC . G06F 17/30719; G06F 17/27; G06F 17/3053
See application file for complete search history.

(56) References Cited

U.S. PATENT DOCUMENTS

| 7,251,781 | B2  |   | 7/2007  | Batchilo et al. |               |
|-----------|-----|---|---------|-----------------|---------------|
| 8,655,004 | B2  |   | 2/2014  | Prest et al.    |               |
| 2009/0198667 | A1 | * | 8/2009 | Groeneveld   | G06F 17/30719 |
| 2011/0282651 | A1 | * | 11/2011 | Nygaard      | G06F 17/30719 |
|           |     |   |         |                 | 704/9         |
| 2012/0210203 | A1 | * | 8/2012 | Kandekar     | G06F 17/30719 |
|           |     |   |         |                 | 715/230       |

(Continued)

OTHER PUBLICATIONS

Shang et al. "Learning to rank-based gene summary extraction", IEEE International Conference on Bioinformatics and Biomedicine, Dec. 18-21, 2013, pp. 1-11.*

(Continued)

*Primary Examiner* — Ariel Mercado

(57) ABSTRACT

A summary of a document is generated in near real time. In aspects, an indication to summarize the document is received and the document is processed to generate a summary. For instance, processing includes extracting sentences from the document and generating a plurality of candidate passages from the extracted sentences. Features are extracted from each of the plurality of candidate passages and each candidate passage is ranked based at least in part on the extracted features. High-ranking candidate passages are considered likely to be important and/or representative of the document. A summary of the document is generated including one or more of the high-ranking candidate passages. The summary includes portions of the document that are considered important and/or representative of the document, so a user may review the summary in lieu of reading the entire document.

20 Claims, 14 Drawing Sheets

(56) References Cited

U.S. PATENT DOCUMENTS

| | | | | |
|---|---|---|---|---|
| 2014/0222834 | A1* | 8/2014 | Parikh | G06F 17/30719 707/748 |
| 2014/0295384 | A1* | 10/2014 | Nielson | G06F 17/275 434/157 |
| 2015/0057992 | A1 | 2/2015 | Danielyan et al. | |
| 2015/0269153 | A1 | 9/2015 | Fink et al. | |
| 2015/0302083 | A1* | 10/2015 | Simske | G06F 17/30719 707/750 |

OTHER PUBLICATIONS

White, et al., "Multidocument Summarization via Information Extraction", in Proceedings of the first international conference on Human language technology research, Mar. 18, 2001, pp. 1-7.

Sateli, et al., "Smarter Mobile Apps through Integrated Natural Language Processing Services", in Proceedings of 10th International Conference Mobile Web Information Systems, Aug. 26, 2013, 15 pages.

Dostal, et al., "Automatic Keyphrase Extraction based on NLP and Statistical Methods", in Proceedings of Annual International Workshop on DAtabases, TExts, Specifications and Objects, Apr. 20, 2011, 6 pages.

https://www.foundationip.com/foundationIP/getAttachments.do?actionCode=1&enc=db27553602e25a5b616a541679f8bb53&encCli=083d2615a02cf692CHEN, et al., "An NTU-Approach to Automatic Sentence Extraction for Summary Generation", Iln Proceedings of a Workshop on Tipster Text Program Phase III, Oct. 13, 1998, pp. 163-170.

Li, et al., "Personalized text snippet extraction using statistical language models", in Journal of Pattern Recognition, vol. 43, Issue 1, Jan. 2010, pp. 378-386.

Liu, et al., "Automatic Keyphrase Extraction via Topic Decomposition", in Proceedings of the Conference on Empirical Methods in Natural Language Processing, Oct. 9, 2010, pp. 366-376.

Chowdhury, Gobinda G., "Natural Language Processing", in Annual review of information science and technology, vol. 37, Issue 1, Jan. 2003, pp. 1-38.

Chatterjee, et al., "Extraction-Based Single-Document Summarization Using Random Indexing", in Proceedings of 19th IEEE International Conference on Tools with Artificial Intelligence, Oct. 29, 2007, pp. 448-455.

Nahnsen, et al., "Lexical Chains and Sliding Locality Windows in Content-based Text Similarity Detection", Iln CSAIL Technical Report, MIT-CSAIL-TR-2005-034, May 19, 2005, pp. 150-154.

Wang, et al., "Learning Query-Biased Web Page Summarization", in Proceedings of the sixteenth ACM conference on Conference on information and knowledge management, Nov. 6, 2007, pp. 555-562.

Shen, et al., "Learning Semantic Representations Using Convolutional Neural Networks for Web Search", in Proceedings of the 23rd International Conference on World Wide Web, Apr. 7, 2014, pp. 373-374.

Varadarajan, et al., "A System for Query-Specific Document Summarization", in Proceedings of the 15th ACM international conference on Information and knowledge management, Nov. 5, 2006, 10 pages.

\* cited by examiner

AUTOMATIC DOCUMENT SUMMARIZATION USING SEARCH ENGINE INTELLIGENCE

BACKGROUND

Reading is an essential part of everyday life, involving reading news articles to reading emails to reading web pages and online documents. In fact, consuming textual content can be very time intensive, especially when a document is long, when the most relevant content is not at the top of the document, and when the important ideas are buried deep within the document. Thus, summarization of the content of a document becomes highly desirable so as to discern the most important ideas, ignore irrelevant information, and capture the central themes of the content in a meaningful way. When a document summary is available, the task of reading a long document becomes more feasible, enabling the reader to easily identify important and/or representative sections of the document and helping the reader to decide whether further review is necessary or desirable.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for providing a summary of a document in near real time. The systems and methods are particularly useful for documents available on a network such as the Internet. For instance, when a document (e.g., web page) is launched in an interface (e.g., web browser) a summary of the document may be generated. In some aspects, an indication to summarize a document is received and the document is processed to generate the summary. Processing may occur over a short time period, enabling the summary to be generated for the document in near real time. Processing includes extracting sentences from the document and generating a plurality of candidate passages from the extracted sentences. Features are then extracted from each candidate passage and the candidate passage is ranked based at least in part on the extracted features. High-ranking candidate passages are considered likely to be important and/or representative of the document. A summary of the document is generated including one or more of the high-ranking candidate passages. The summary includes portions of the document that are considered important and/or representative of the document, so a user may review the summary in lieu of reading the entire document.

In one aspect, a system is provided. The system includes a processing unit and a memory storing computer executable instructions that, when executed by the processing unit, cause the system to perform a method. The method includes causing a document to open in an interface and receiving an indication to summarize the document. The method further comprising generating a plurality of candidate passages for the document and extracting one or more features for each candidate passage of the plurality of candidate passages. Additionally, the method includes ranking each candidate passage of the plurality of candidate passages based at least in part on the extracted one or more features and generating a summary of the document, where the summary includes at least the highest ranked candidate passage of the plurality of candidate passages.

In another aspect, a system is provided. The system includes a processing unit and a memory storing computer executable instructions that, when executed by the processing unit, cause the system to receive an indication to summarize a document and to generate a plurality of candidate passages for the document. The system further caused to extract one or more features for each candidate passage of the plurality of candidate passages and to score each candidate passage of the plurality of candidate passages based at least in part on the extracted one or more features. Additionally, the system caused to identify one or more high-scoring candidate passages of the plurality of candidate passages, where the high-scoring candidate passages are likely representative of the document.

In yet another aspect, a method of summarizing a document is provided. The method includes causing a document to open in an interface and receiving an indication to summarize the document. The method further includes generating a plurality of candidate passages for the document and retrieving search query data, where the search query data correlates at least one search query with the document. Additionally, the method includes determining a similarity between the at least one search query and each candidate passage of the plurality of candidate passages. The method also includes identifying one or more candidate passages having high similarity to the at least one search query as likely representative of the document and generating a summary of the document including the one or more candidate passages identified as likely representative of the document.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for generating a summary of a document in near real time. The systems and methods are particularly useful for documents available on a network such as the Internet. For instance, when a document (e.g., web page) is launched in an interface (e.g., web browser) a summary of the document may be generated. In some aspects, an indication to summarize the document is received and the document is processed to generate the summary. Processing may occur over a short time period, enabling a summary to be generated for the document in near real time. Processing includes extracting sentences from the document and generating a plurality of candidate passages from the extracted sentences. Features are then extracted from each candidate passage and the candidate passage is ranked based at least in part on the extracted features. High-ranking candidate passages are considered likely to be important and/or representative of the document. A summary of the document is generated including one or more of the high-ranking candidate passages. The summary includes portions of the document that are considered important and/or representative of the document, so a user may review the summary in lieu of reading the entire document.

It is with respect to these and other general considerations that embodiments have been made.

Figure 1:
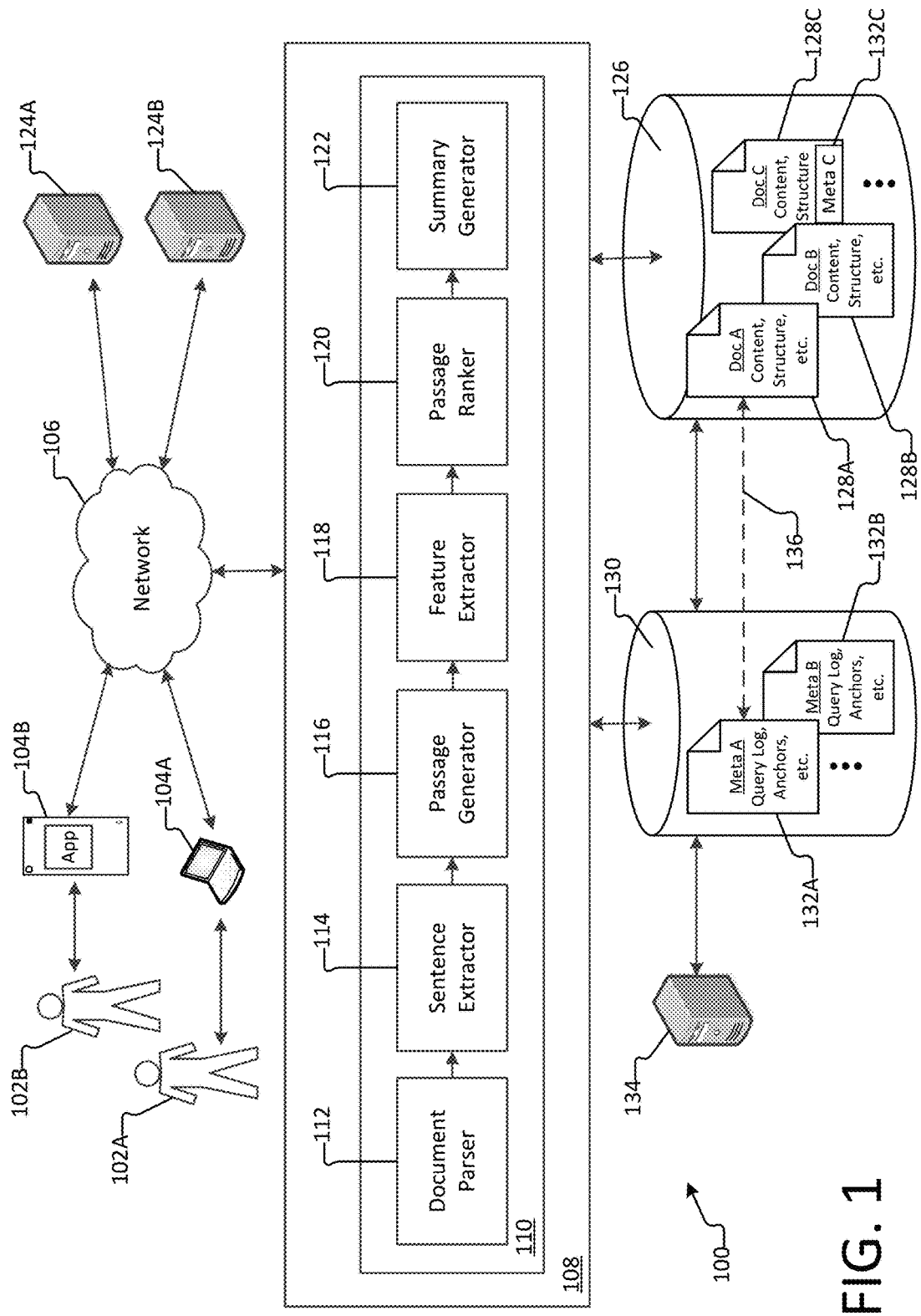
FIG. 1 illustrates a system for generating a summary of a document using search engine intelligence, according to an example embodiment.

FIG. 1 illustrates a system for generating a summary of a document using search engine intelligence, according to an example embodiment.

As illustrated, one or more client computing devices 104 (e.g., client computing devices 104A and 104B) may execute a client version of a document summarization application capable of summarizing a document and presenting the summary to a user in near real time. As used herein, a "summary" of a document is defined as one or more passages of the document that are extracted to concisely convey the main ideas of the document. The summary is generated by identifying the one or more passages having the greatest likelihood of being important and/or representative of the main ideas within the document.

In some examples, the client document summarization application may execute locally on a client computing device. In other examples, the client document summarization application (e.g., mobile app) may operate in communication (e.g., via network 106) with a corresponding server version of document summarization application 110 executing on one or more server computing devices, e.g., server computing device 108. In still other aspects, rather than executing a client version of a document summarization application, the one or more client computing devices 104 may remotely access, e.g., via a browser over network 106, the document summarization application 110 implemented on one or more server computing devices 108. In this regard, document summarization application 110 is capable of summarizing a document and presenting the summary to a user.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client document summarization application and/or remotely accessing document summarization application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

As described above, the document summarization application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud-based computing environment). Server computing device 108 may provide data regarding a document to and from the one or more client computing devices 104 and or one or more other server computing devices (e.g., server computing devices 124A and/or 124B) via network 106.

As used herein, a document may be classified within a document type, e.g., a newspaper article, a journal article (e.g., scientific, technical, medical, etc.), a Wikipedia® article, a novel, a textbook, an email, a webpage, a presentation document (e.g., PowerPoint®, Prezi®, etc.), a spreadsheet document (e.g., Excel® document), and the like. Further, a document may be provided digitally in any file format, e.g., .doc, .docx, .html, .xml, etc. A document may also be defined by a "layout," which involves positional information (e.g., top, bottom, first, last, etc.), hierarchical information (e.g., text under a secondary header, which is under a primary header, which is within a second chapter, etc.), structural information (e.g., lists, outlines, headers, etc.), and formatting information (e.g., indentations, bold, italics, underscore, font size, etc.).

The document may also include one or more types of content, e.g., textual, graphical, audio, video, etc. In aspects, textual content may be plain text or may be structured or formatted, e.g., styled text, rich text, etc. Textual content within a document may be divided into units of information called "sentences." As used herein, a "sentence" is a unit of text that is separated from other units of text by delimiters (e.g., traditional or non-traditional delimiters). As a first example, a sentence may be a unit of text that starts with an upper-case letter (traditional beginning delimiter) and ends with punctuation such as a period, question mark, or exclamation mark (traditional ending delimiter). As a second example, a sentence may be a unit of text that begins with a lower-case letter that is preceded by a bullet, numeral, or hard return (non-traditional beginning delimiter). Furthermore, the unit of text described in the second example may not end with a traditional ending delimiter (e.g., period, question mark or exclamation mark) but may be separated from other units of text by one or more spaces, a hard return, etc. (non-traditional ending delimiter). As should be appreciated, a sentence may be separated from other units of text based on a combination of traditional and/or non-traditional delimiters (e.g., beginning with an upper-case letter and ending with one or more spaces, a hard return, etc.).

The document summarization application may operate in conjunction with any type of digital document application or web browser that provides access to word processing documents, spreadsheets, presentations, publications (including books, journals, newspapers, etc.), webpages, emails, and the like. In one example, the document summarization application may be incorporated into, or in communication with, a digital document application. The digital document application may be executed locally on the one or more client computing devices 104 or executed remotely on server computing device 108 or on other server computing devices, e.g., server computing devices 124A and/or 124B. As detailed herein, a digital document application enables a user to access (e.g., view, read, present, display, etc.) a document (e.g., via a document reader, an interface, and the like) and further enables the user to summarize the accessed document. According to another example, the document summarization application 110 may be incorporated into, or in communication with, a web browser. In general, a web browser processes Hyper Text Markup Language (HTML) or other markup language in order to render a webpage (e.g., a document) in a browser window. In some examples, the document summarization application 110 may be embedded as a browser extension within a web browser.

As should be appreciated, one or more documents (e.g., documents 128A and 128B) may be stored in one or more storage locations accessible to the digital document application, the web browser, and/or the document summarization application 110, e.g., storage 126. In at least some examples, the one or more documents may be stored in different storage locations within a distributed environment (e.g., cloud-based computing environment) that is accessible to the digital document application, the web browser, and/or the document summarization application 110 over a network, e.g., network 106.

As illustrated in FIG. 1, the document summarization application 110 may include a document parser 112, a sentence extractor 114, a passage generator 116, a feature extractor 118, a passage ranker 120, and a summary generator 122. The various components may be implemented using hardware, software, or a combination of hardware and software. As described above, the document summarization application 110 may be configured to provide a real-time summary of a document. That is, upon receiving an indication to summarize a document, the document summarization application 110 may undertake one or more processes including: parsing the document, extracting sentences from the document, generating candidate passages from the extracted sentences, extracting features associated with the generated candidate passages, ranking the generated candidate passages based at least in part on the extracted features, and generating a summary of the document based at least in part on the ranking. In aspects, these processes may be implemented within a short period of time such that a summary of the document may be generated in near real time.

In some aspects, an indication to summarize a document may be received when the document is accessed (e.g., opened, launched, etc.) via a digital document application, a web browser, etc., and the document summarization application 110 may automatically provide a summary of the document. In other aspects, an indication to summarize a document may be received upon selection by a user, e.g., by clicking or otherwise activating a control (e.g., icon, button, etc.) associated with the document summarization application 110 (e.g., provided as an extension to a web browser).

For instance, in response to receiving an indication to summarize a document, the document parser 112 may process the content and visual structure of the document to understand the content of the document. For example, as described above and more fully with reference to FIG. 2, a document may include linguistic aspects (e.g., word choice, grammar constructs, formal or informal language usage, and the like) and structural aspects (e.g., hierarchical structure, formatting, hyperlinked information, sentence structure, paragraph structure, outlining structure, organization, and the like). Document parser 112 may identify one or more linguistic aspects and/or structural aspects for the document.

Sentence extractor 114 may reduce the document to a list of ordered sentences, S. As described above and more fully with reference to FIGS. 2 and 3, a sentence is defined as a unit of text that is separated from other units of text by delimiters (e.g., beginning delimiters and ending delimiters). In aspects, sentence extractor 114 identifies each sentence of the document and generates an ordered list (or series) of the sentences, e.g., S1, S2, S3, S4, etc. As described above, sentence extractor 114 may identify a sentence by identifying traditional or non-traditional delimiters that separate the sentence from other sentences. For example, the sentence extractor 114 may identify a first sentence that begins with an upper-case letter (e.g., traditional beginning delimiter) that follows any introductory document information (e.g., title, author, header, etc.) and ends with a period, question mark, or exclamation mark (e.g., traditional ending delimiter). Sentence extractor 114 may also identify a second sentence immediately following the ending delimiter of the first sentence, beginning with a lower-case letter that is preceded by a bullet point (e.g., a non-traditional beginning delimiter) and ending with a hard return (e.g., non-traditional ending delimiter). As should be appreciated, the above examples are provided for purposes of clarification and should not be understood to be limiting. Rather, as described above, sentence extractor 114 may identify sentences based on any combination of beginning and ending, traditional and non-traditional delimiters.

Figure 3:
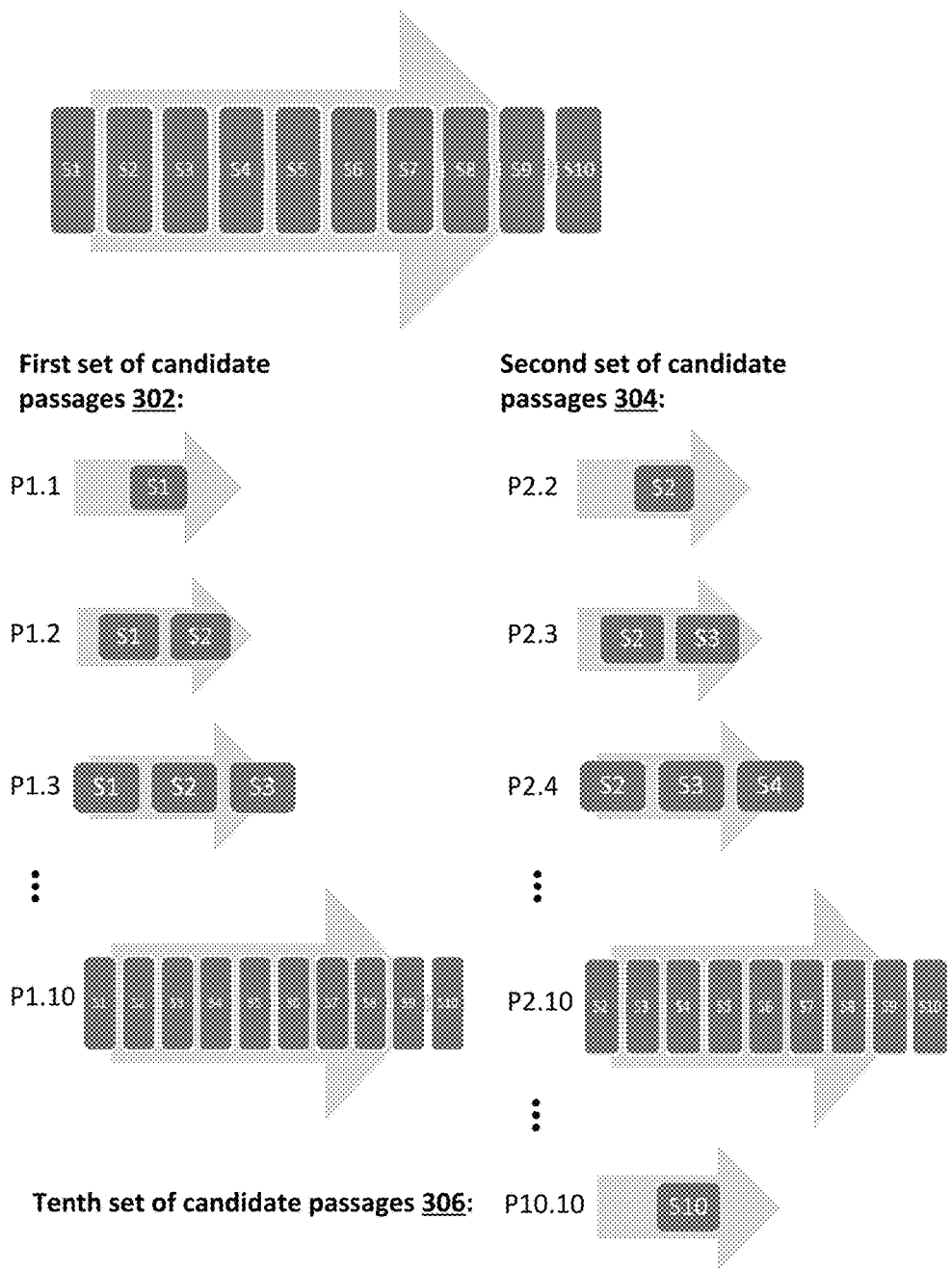
FIG. 3 illustrates a method for generating contiguous candidate passages for a document, according to an example embodiment.

Passage generator 116 may combine the sequence of sentences, S, into a set of candidate passages, P. Candidate passages may be generated in several ways. In a first aspect, candidate passages may be generated using a sliding window approach, as illustrated by FIG. 3. The sliding window approach iteratively combines sequential sentences into a set of overlapping candidate passages. Candidate passages generated using this process may be referred to herein as "contiguous candidate passages." In some examples, rules for generating contiguous candidate passages may be established. For instance, each candidate passage may be generated to include a minimum of 1 sentence and a maximum of 10 sentences, and in some aspects, each candidate passage may additionally be restricted to a maximum of 350 characters. In this case, if additional sentences cause a candidate passage to exceed 350 characters, the candidate passage may be limited to less than 10 sentences (e.g., to a number of sentences not exceeding 350 characters). As should be appreciated, other rules or restrictions for generating candidate passages are conceivable and the above rules and restrictions should not be understood to be limiting.

By way of example, as illustrated by FIG. 3, for a document containing 10 sentences, S1-S10, a set of candidate passages is generated based on the first sentence (P1 et seq.), a set of candidate passages is generated based on the second sentence (P2 et seq.), and so on through the tenth sentence. For example, to generate a first set of candidate passages, a first candidate passage (P1.1) is generated with only the first sentence (S1), then a second candidate passage (P1.2) is generated with the first and second sentences (S1-S2), a third candidate passage (P1.3) is generated with the first, second and third sentences (S1-S2-S3), and so on through the tenth candidate passage. In generating a second set of candidate passages, an eleventh candidate passage (P2.2) is generated with only the second sentence (S2), a twelfth candidate passage (P2.3) is generated with the second and third sentences (S2-S3), a thirteenth candidate passage (P2.4) is generated with the second, third and fourth sentences (S2-S3-S4), and so on through candidate passage P10.10 (which is generated with only the tenth sentence, S10). In this regard, the ordered list of sentences, S, may be expanded into one or more sets of candidate passages, P.

In addition to the contiguous candidate passages generated by the sliding window, synthetic candidate passages may be generated by combining the text from various parts of the document into a single coherent candidate passage. As further illustrated by FIG. 4, synthetic candidate passages can be composed using one or more of the following processes: removing a header and combining text falling before and after the header; combining text surrounding graphical elements such as graphs, tables and images; summarizing and shortening a long list of text into a more concise list of text; and shortening complex formatted text into condensed formatted text. While candidate passages may be generated using different processes, e.g., generating contiguous candidate passages or synthetic candidate passages, the general term "candidate passage" may be used herein to refer to contiguous candidate passages, synthetic candidate passages, or any other type of candidate passage generated using any process or method, either described herein or developed in the future.

In aspects, a document may contain several hundreds of candidate passages, some of which may be overlapping. In order to reduce the candidate passages to the most salient candidate passages, feature extractor 118 extracts various features that depict an importance of each candidate passage across several dimensions. That is, upon processing by the feature extractor 118, each candidate passage is represented by a feature vector that characterizes the candidate passage. A feature vector may represent a compilation of extracted features for a candidate passage. That is, the feature vector may be calculated to provide an overall characterization for each candidate passage based on a compilation of the extracted features. Moreover, calculation of the overall characterization may be weighted, e.g., some extracted features may be considered more determinative of whether a candidate passage is important and/or representative of the document than others and may be given more weight in calculating the overall characterization. The feature vectors, along with human judgment information, may further constitute a set of training data for a machine-learned model that identifies and selects important candidate passages from a document. As described in more detail with respect to FIG. 2, features may include one or more of: "document-level features," "readability features," "presentation/layout features," "representativeness features" and "search metadata."

Document-level features help discriminate between the various candidate passages based on content characteristics of the document. In some aspects, document-level features may be used in combination with generalized rules to infer the importance of different candidate passages in relation to the document as a whole. For example, generalized rules may include inferences such as: very long documents are likely to contain important passages at the top, visual headers are likely to be important in medical documents, and spam documents are not likely to contain any useful information. Document-level features are common across all candidate passages of a particular document and include "document classifier scores" and "document meta" features. For instance, document classifier scores include: a "spam/junk" classifier that indicates how likely the document is spam, an "adult" classifier score that indicates how likely the document includes content deemed suitable for individuals over a certain age (e.g., 18) or content subject to parental discretion, a "page quality" score that indicates whether the document is an authoritative source for a specific content type (e.g., a technical article, a medical article, a scientific article, a literary article, news article, etc.), and similar classifiers. Additionally, document-level features include "document meta" features that indicate, for example, document length, number of visual headers in the entire document, whether the document is from Wikipedia® or from a community question-answering site, and the like.

Readability features indicate how "readable" (e.g., how complex) a specific candidate passage is and whether the candidate passage includes enough content (e.g., nouns, descriptive words) to be analyzed. For example, readability features depict a relative complexity of the candidate passage and include "passage meta features," "lexical density features," "type-token ratio features," and "direct readability features." For example, passage meta features include: the length of the candidate passage; the number of tokens (e.g., symbols), nouns, verbs, symbol words, stop words, named entities (e.g., person names, organization names, geographic names, etc.), quantity entities (e.g., length, weight, distance, area, etc.), and the like; the number of punctuation marks, etc. In aspects, passage meta features may be identified using a maximum entropy model, e.g., which identifies named entities and regular expressions and also identifies the quantity of entities in the text.

Readability features such as lexical density features, include: the density of content words (e.g., content words include the content of the document, such as nouns, adjectives, most verbs and adverbs) in relation to the density of function words (e.g., function words are used to describe the content of the document, such as pronouns, prepositions, conjunctions, auxiliary verbs, determiners and interjections). Many of the lexical density features involve tagging input text with part-of-speech (POS) tags, e.g., using a standard Brill tagger to tag the text.

From the area of linguistics, another readability feature that is used to characterize the nature of text is called a type-token ratio feature. A type-token ratio determines how many unique words are included in a candidate passage as compared to a total number of words in the candidate passage. Additionally, direct readability features include: average word length in a candidate passage, average number of words in a candidate passage, density of long words in a candidate passage, whether one or more sentences within a candidate passage start with a pronoun, whether one or more sentences within a candidate passage start with a lower-case letter, whether one or more sentences within a candidate passage end with a traditional delimiter, such as a period, question mark or exclamation mark, and the like.

Presentation/layout features describe a candidate passage in relation to structural aspects of the document. In this regard, presentation/layout features describe a location of a candidate passage within a document, e.g., whether the candidate passage is situated at the top or bottom of a page, a distance to the nearest heading, and whether the passage spans across multiple paragraphs. Presentation/layout features may also indicate whether formatting suggests that a certain portion of text within a candidate passage is primary content or advertisements, and/or whether a candidate passage was generated as a contiguous candidate passage or a synthesized candidate passage. In some aspects, a "DOM tree" may be utilized to identify the various structural aspects of a document such as a web page. In general, a document object model (DOM) tree organizes each portion of a web page into nodes within a hierarchical structure representative of the page content, syntax and formatting. The top-most node is referred to as the "document object."

Representativeness features indicate how similar a candidate passage is to the entire document and, thus, may infer the relative importance of the candidate passage. Representativeness features include a similarity score representing how similar a candidate passage is to the title of the document, how similar a candidate passage is to a meta description of a page, how similar a candidate passage is to visual headers in a page, and the like.

Search metadata indicates whether words or phrases included in a candidate passage match historical search queries that returned the document. As will be described further herein, a search engine may be implemented by one or more server computing devices (e.g., server computing device 134) in communication with server computing device 108. In general, the search engine may receive and process search queries for locating documents associated with network 106 (e.g., an enterprise intranet or the Internet). As described above, the documents (e.g., documents 128A and 128B) associated with network 106 may be stored in one or more storage locations, e.g., storage 126, as part of a document collection.

In general, during a previous time period, the search engine may have received a textual and/or spoken language input (e.g., search query). For instance, the search query may have been input by user 102A into client computing device 104A, routed through network 106, and received by a server computing device 134 implementing the search engine. Alternatively, the search query may have been a machine-generated query initiated by client computing device 104A or another client or server computing device. According to aspects, the term "search query" broadly refers to any request for information posed to the search engine. In response to the search query, the search engine may parse the search query to identify search criteria (e.g., search keys), identify all documents in a document collection (e.g., accessible in storage 126) that matched the search criteria (e.g., "candidate documents"), rank the candidate documents based on a predicted relevance to the search criteria, and present the results to the user beginning with the most relevant candidate document. Additionally, during the previous time period, the search engine may have received a selection of one or more of the presented results.

In some aspects, upon processing each search query, the search engine may compile a query log that correlates each search query with results returned from the document collection. Additionally, the search engine may log the one or more documents selected based on the returned results. For example, the search query "what is a DOM tree?" may have returned documents A, B, and C within the document collection. The search engine may have presented the results in an order based on a predicted relevance to the search query, e.g., first presenting document B (with the highest relevancy ranking), then document C, and finally document A. From the presented results, the user may have selected document C (the document having the second highest relevancy ranking). In this case, the search engine may correlate the search query with returned documents A, B and C, and may log the correlation in a query log. Additionally or alternatively, the search engine may correlate the search query with selected document C, and may log the correlation in a query log. Further based on the example above, document C may have been selected for each of the following queries: "what is a DOM tree?" "What are nodes in a document object model?" and "how is HTML rendered?" In this case, the search engine may identify a correlation between each of these search queries and document C. This correlation between the search queries and document C may be stored by the search engine in the query log.

In some cases, the query log may be a "global" query log that stores information correlating each search query to one or more documents in the document collection. For instance, a global query log may store correlations between search queries and documents of a document collection in an index, table or a relational database. Alternatively, the query log may be an "individual" query log that is specific to a particular document and stores information regarding each search query that returned that document and/or each search query for which the document was selected. An individual query log may store correlations between the particular document and different search queries in an index, table, etc. As should be appreciated, additional or different analytics correlating one or more search queries to a document may be collected and stored in the query log.

In some examples, the query log may be stored in a different storage location (e.g., storage 130) or the same storage location (e.g., storage 126) as the document collection. In further examples, the query log may be included in search metadata that is associated with a particular document (e.g., by a pointer, reference, or otherwise) or appended to the particular document (e.g., within a meta field). As should be appreciated, the above examples are not intended to be limiting and a query log may be generated to correlate search queries with documents in any suitable manner and may be stored in any suitable location.

As illustrated by FIG. 1 and detailed above, search metadata may be associated with a document, e.g., Meta A 132A may be associated with Doc A 128A (illustrated by dashed line 136). In aspects, search metadata may be stored in the same location or a different location than the document collection. For instance, Meta A 132A is stored in a different storage location (e.g., storage 130) than Doc A 128A, whereas Meta C 132C is appended to Doc C 128C and stored in the same storage location (e.g., storage 126) as Doc C 128C. As detailed above, search metadata for a particular document may include references or links to a query log or may include the query log as appended data. In further examples, search metadata for a document may also include anchor (e.g., hyperlink) information. Anchors are defined as links established in other documents that link to the particular document (or portions of the document) for which the summary is requested and/or links in the particular document to other documents. Thus, Meta A 132A associated with Doc A 128A may include information regarding other documents in the document collection (e.g., anchor documents) that include hyperlinks to Doc A 128A. Additionally, anchor information may include links established within Doc A 128A that link to other documents within the document collection (e.g., anchor documents).

With respect to candidate passages, search metadata enables evaluation of each candidate passage for similarity to historical search queries that returned the document and/or resulted in selection of the document. In aspects, the more similar the candidate passage is to one or more search queries that returned the document (or resulted in selection of the document), the more likely the candidate passage is representative of the document. Additionally, the more similar the candidate passage is to anchor documents associated with the document, the more likely the candidate passage is representative of the document. In order to determine similarity, a distance between the search metadata and the candidate passage may be calculated. The shorter the distance between the search metadata and the candidate passage, the more likely that the candidate passage is representative of the document. As should be appreciated, the distances between the search metadata and the candidate passage may be incorporated into the feature vector for the candidate passage.

The passage ranker 120 may score each candidate passage to identify the most important, representative and/or salient candidate passages for a document. In aspects, passage ranker 120 may utilize a machine-learned model in order to score the candidate passages. The machine-learned model may be trained by both positive and negative labels. For instance, positive labels may be collected that include a combination of editorial judgments describing how important a specific passage is to a document, as well as candidate passages that are known to be important to the document. Negative labels may be collected by randomly sampling a large number of candidate passages and identifying (e.g., by heuristics) candidate passages that are known to be of lower quality, e.g., candidate passages that do not end with proper delimiters, candidate passages that start with lower-case letters or punctuation marks, and candidate passages that contain non-standard characters. Based on the machine-learned model, a gradient-boosted, decision tree-based classifier (e.g., passage classifier) may be developed and trained to discriminate between higher quality passages and perceivably lower quality passages.

After the passage classifier has been trained, it may be applied in near real time to candidate passages of a document so as to identify the most important, representative and/or salient candidate passages. In particular, the passage ranker 120 may apply the passage classifier to the candidate passages for a particular document and score (or rank) each candidate passage based at least on the feature vector calculated for the candidate passage. As should be appreciated, certain contiguous candidate passages may include overlapping portions of the document (e.g., candidate passage P1.4, including sentences S1-S2-S3-S4, and candidate passage P2.4, including sentences S2-S3-S4). If S2 and S3 are highly representative of the document, P1.4 and P2.4 may receive the same score or rank. In some aspects, duplicate candidate passages (e.g., passages having the same score with overlapping data) may be eliminated from the set of candidate passages because these candidate passages contain redundant content. Upon scoring each candidate passage (and removing any duplicate candidate passages), the high-scoring candidate passages may be identified as important, representative, and/or salient portions of the document.

Figure 5:
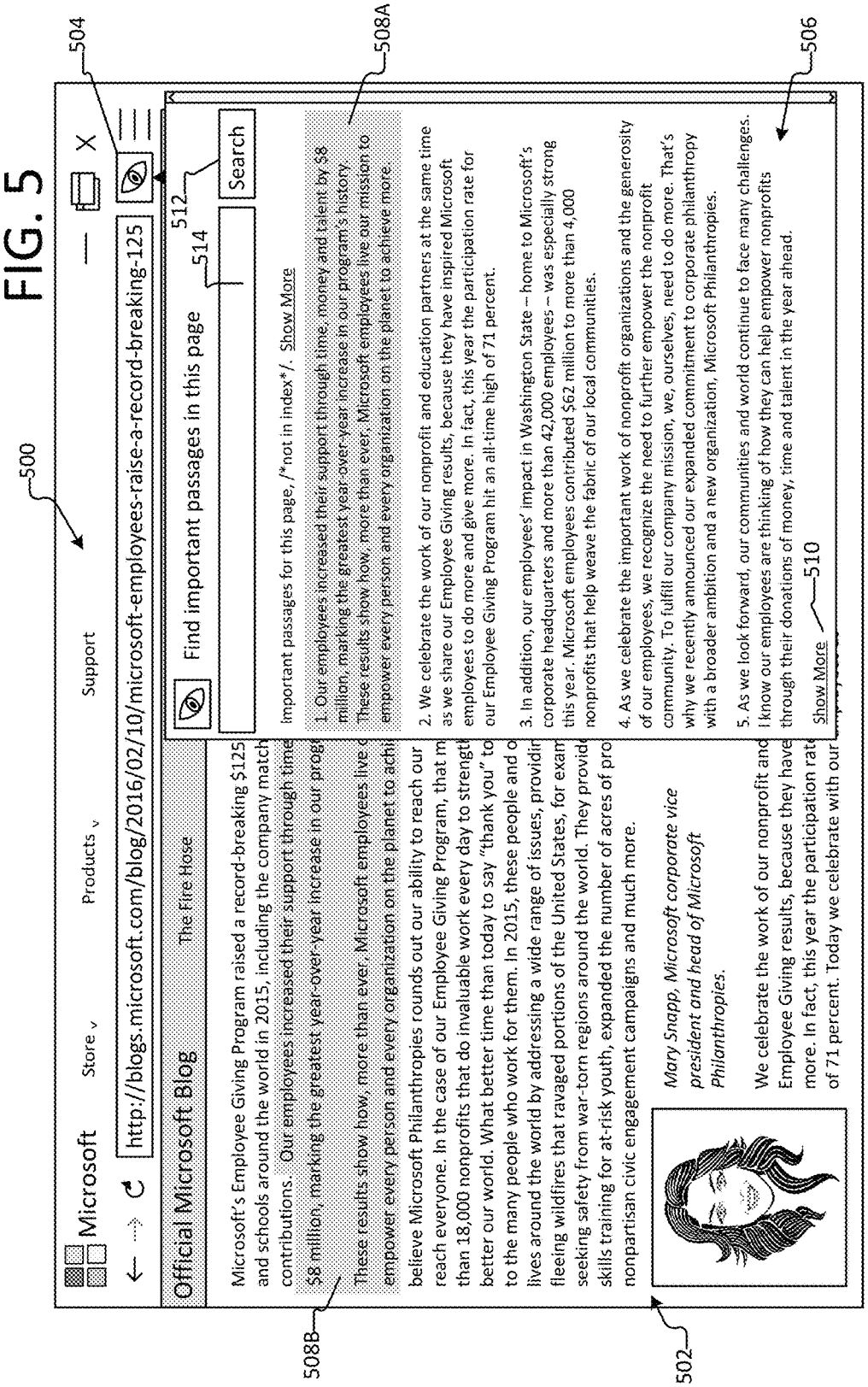
FIG. 5 illustrates an interface for displaying a summary of document, according to a first example embodiment.
Figure 6:
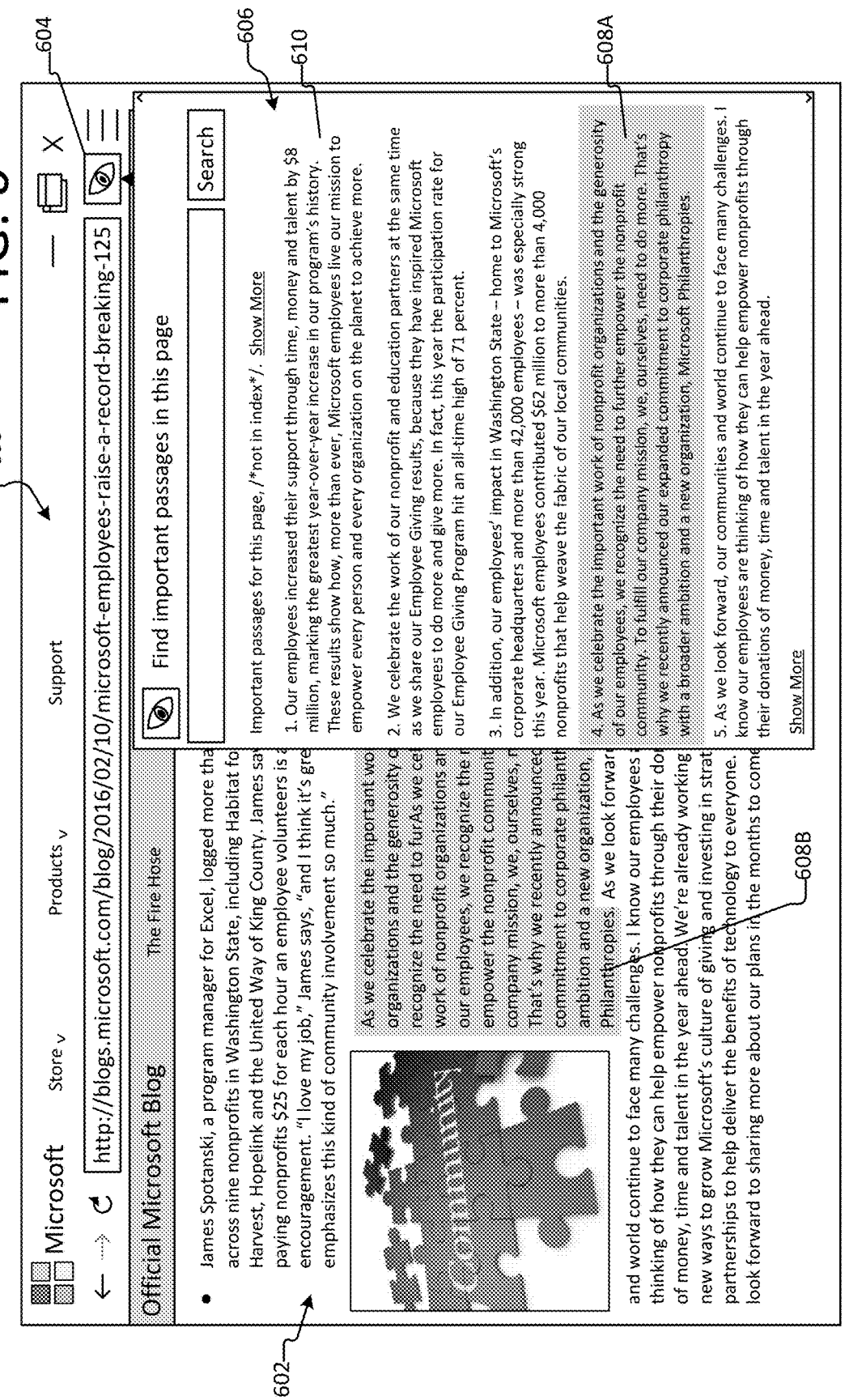
FIG. 6 illustrates an interface for displaying a summary of document, according to a second example embodiment.

As further illustrated by FIGS. 5 and 6, summary generator 122 may present the high-scoring candidate passages as a summary for the document. In some aspects, summary generator 122 may present a set number of the high-scoring candidate passages. For instance, summary generator 122 may present the top five high-scoring candidate passages as a summary for the document. As should be appreciated, any suitable number of high-scoring candidate passages may be displayed based on a preset rule or any suitable criteria, e.g., more high-scoring candidate passages may be presented for longer documents and fewer high-scoring candidate passages may be presented for shorter documents. Additionally or alternatively, fewer high-scoring candidate passages may be displayed when a user is accessing the document summary application via a mobile application and more high-scoring candidate passages may be displayed when a user is accessing the document summary application on a web browser of a personal computing device.

According to some aspects, candidate passages may be presented within the summary in the order in which they fall within the document, regardless of a relative ranking between the high-scoring candidate passages. For instance, a candidate passage that appears later in the document (e.g., a concluding paragraph) may be presented as the last candidate passage in the summary even if that candidate passage received the highest score among the other high-scoring candidate passages. Alternatively, the high-scoring candidate passages may be presenting within the summary in order of the relative ranking between the high-scoring candidate passages. That is, the highest scoring candidate passage may be presented first, then the second highest scoring candidate passage, and so on. As should be appreciated, other guidelines for presenting candidate passages within the summary are possible and the above examples are not intended to limit the methods and systems described herein.

The summary may be presented in a ribbon, pane, or window adjacent to the document. In some cases, the summary may be presented as an overlay over at least a portion of the document. In aspects, when a user highlights one of the candidate passages in the summary, display of the document may advance to a location of the corresponding candidate passage within the document. In further aspects, the corresponding candidate passage may be highlighted within the document. Alternatively, rather than presenting the summary in a separate pane or window, the high-scoring candidate passages may be highlighted throughout the document. As should be appreciated, other methods and techniques of presenting a summary of the document are possible and the above examples are not intended to be limiting.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
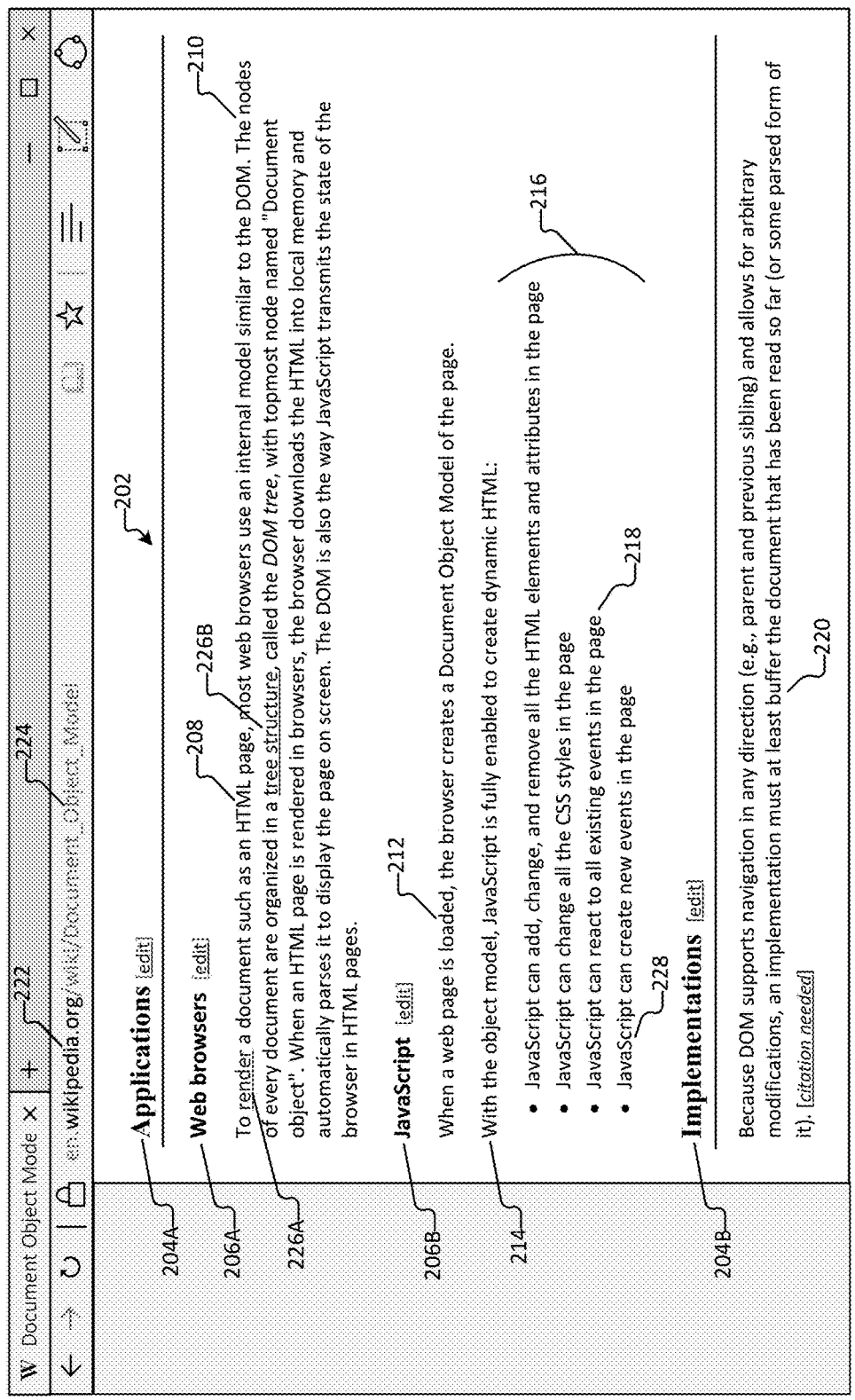
FIG. 2 illustrates an interface for displaying a document, according to an example embodiment.

FIG. 2 illustrates an interface for displaying a document, according to an example embodiment.

As illustrated, interface 200 displays a document 202. The text of document 202 is organized based on a number of headers and includes traditional and non-traditional sentences. For instance, document 202 includes primary headers 204A and 204B, and secondary headers 206A and 206B. Following the primary header 204A and the secondary header 206A, document 202 includes four traditional sentences. For example, document 202 includes a first sentence 208 (S1) beginning with an upper-case letter "T" (traditional starting delimiter) and ending with a period (traditional ending delimiter) as follows: "To render a document such as an HTML page, most web browsers use an internal model similar to the DOM." Similarly, document 202 includes a second sentence 210 (S2) beginning with an upper-case letter "T" (traditional starting delimiter) and ending with a period (traditional ending delimiter) as follows: "The nodes of every document are organized in a tree structure, called the DOM tree, with topmost node named 'Document object'." Additionally, the first sentence 208 and the second sentence 210 include anchors 226A and 226B (identified with underscore). As described above, anchors 226A and 226B link document 202 to other documents in a document collection. As illustrated, the third sentence (S3) and the fourth sentence (S4) are similar traditional sentences to the first and second sentences, but these sentences do not include anchors.

Following the secondary header 206B, document 202 includes one traditional sentence and five non-traditional sentences. For example, similar to the description above, a fifth sentence 212 (S5) begins with an upper-case letter "W" (traditional starting delimiter) and ends with a period (traditional ending delimiter) as follows: "When a web page is loaded, the browser creates a Document Object Model of the page." However, a sixth sentence 14 (S6) begins with an upper-case letter "W" (traditional starting delimiter) but ends with a colon (non-traditional ending delimiter) as follows: "With the object model, JAVASCRIPT is fully enabled to create dynamic HTML:" Additionally, bulleted list 216 includes four non-traditional sentences. For instance, a ninth sentence 218 (S9) begins with an upper-case letter "J" (traditional starting delimiter) but ends with a hard return (non-traditional ending delimiter) as follows: "JAVASCRIPT can react to all existing events in the page". The secondary header 206B and five of the six sentences under this header include a named entity 228, i.e., "JAVASCRIPT."

As will be further described with reference to FIG. 3, contiguous candidate passages may be generated for document 202 by iteratively combining the traditional and non-traditional sentences identified above. For instance, a first set (P1) of candidate passages for document 202 may be generated with a first candidate passage (P1.1) including first sentence 208 (S1), a second candidate passage (P1.2) including the first sentence 208 (S1) and a second sentence 210 (S2), and so on through a tenth sentence. Similarly, a second set (P2) of candidate passages for document 202 may be generated with candidate passage (P2.2) including second sentence 210 (S2), and so on through eleventh sentence 220 (S11). Additionally, as described above, synthetic candidate passages may be generated from document 202, e.g., by removing a header and combining text falling before and after the header; combining text surrounding graphical elements such as graphs, tables and images; summarizing and shortening a long list of text into a more concise list of text; shortening complex formatted text into condensed formatted text; and the like.

In addition to the organization of document 202 described above, e.g., including a number of headers with traditional and non-traditional sentences, document 202 may also be defined by features including one or more of: "document-level features," "readability features," "presentation/layout features," "representativeness features" and "search metadata." These various features may be extracted by feature extractor 118 in processing document 202. For instance, a document-level feature identifying document 202 as a Wikipedia® article 222 may be extracted. Readability features may also be extracted for the various candidate passages of document 202, such as "passage meta features," "lexical density features," "type-token ratio features," and "direct readability features," as detailed above. For instance, a number of the candidate passages of document 202 include named entity 228. Additionally, presentation/layout features may be extracted for the candidate passages of document 202, including locations of various candidate passages within document 202, e.g., whether the candidate passage is situated at the top or bottom of a page, a distance to the nearest heading, and whether the passage spans across multiple paragraphs. For example, the first candidate passage (P1.1) is located at the top of the page and is a first candidate passage following secondary header 206A. Similarly, the second candidate passage (P1.2), which also includes first sentence 208, is located at the top of the page and is a first candidate passage following secondary header 206A. The fifth candidate passage (P1.5), including the first sentence 208 through the fifth sentence 212, spans multiple paragraphs.

Representativeness features may also be extracted for the candidate passages of document 202. The title 224 of the document 202 is "Document Object Model." In this case, a number of candidate passages which include this phrase may receive a high similarity score to the title, e.g., second sentence 210 and fifth sentence 212. Search metadata features extracted for the candidate passages of document 202 may include determining whether words or phrases included in candidate passages match historical search queries that returned document 202. For instance, document 202 may have been returned and/or selected based on the following search queries: "what is a DOM tree?" "What are nodes in a document object model?" and "how is HTML rendered?" In this case, a candidate passage including the second sentence 210 may match the first search query and the second search query, while a candidate passage including the third sentence may match the third search query. A candidate passage including both the second and third sentences would match the first, second and third search queries. In this example, a candidate passage including both the second and third sentences may be ranked higher than a candidate passage including either the second or the third sentence by virtue of matching more search queries.

As described above, after extracting features of the various candidate passages, the document summary application may generate feature vectors for each candidate passage, apply a machine-learned passage classifier to score each of the candidate passages, and select the highest scoring candidate passages for a summary of document 202 (not shown).

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

FIG. 3 illustrates a method for generating contiguous candidate passages for a document, according to an example embodiment.

As described above, passage generator 116 may combine a sequence or series of sentences, S, into a set of candidate passages, P. For instance, candidate passages may be generated using a sliding window approach. The sliding window approach iteratively combines sequential sentences into a set of overlapping, contiguous candidate passages. As noted above, rules for generating contiguous candidate passages may be established, e.g., each candidate passage may be generated to include a minimum of 1 sentence and a maximum of 10 sentences and/or each candidate passage may be restricted to a maximum of 350 characters.

By way of example, as illustrated by FIG. 3, for a document 300 containing 10 sentences, S1-S10, a first set of candidate passages 302 is generated based on the first sentence (P1 et seq.), a second set of candidate passages 304 is generated based on the second sentence (P2 et seq.), and so on through the tenth set of candidate passages 306. For example, to generate the first set of candidate passages 302, a first candidate passage (P1.1) is generated with only the first sentence (S1), then a second candidate passage (P1.2) is generated with the first and second sentences (S1-S2), a third candidate passage (P1.3) is generated with the first, second and third sentences (S1-S2-S3), and so on through the tenth candidate passage (P1.10), which is generated with the first through tenth sentences (S1-S2-S3-S4-S5-S6-S7-S8-S9-S10).

In generating the second set of candidate passages 304, an eleventh candidate passage (P2.2) is generated with only the second sentence (S2), a twelfth candidate passage (P2.3) is generated with the second and third sentences (S2-S3), a thirteenth candidate passage (P2.4) is generated with the second, third and fourth sentences (S2-S3-S4), and so on through candidate passage P2.10 which is generated with the second through tenth sentences (S2-S3-S4-S5-S6-S7-S8-S9-S10). As should be appreciated, this iterative approach may be carried through for each of the traditional and non-traditional sentences of a document 300 having ten sentences. In this case, the tenth set of candidate passages 306, including candidate passage P10.10, is generated with only the tenth sentence (S10). Thus, as illustrated by FIG. 3, an ordered list of sentences, S, may be expanded into one or more sets of contiguous candidate passages, P, using a sliding window approach.

As should be appreciated, FIG. 3 is described for purposes of illustrating the present methods and systems and is not intended to limit the disclosure to a particular sequence of steps, e.g., steps may be performed in differing order, additional steps may be performed, and disclosed steps may be excluded without departing from the present disclosure.

Figure 4:
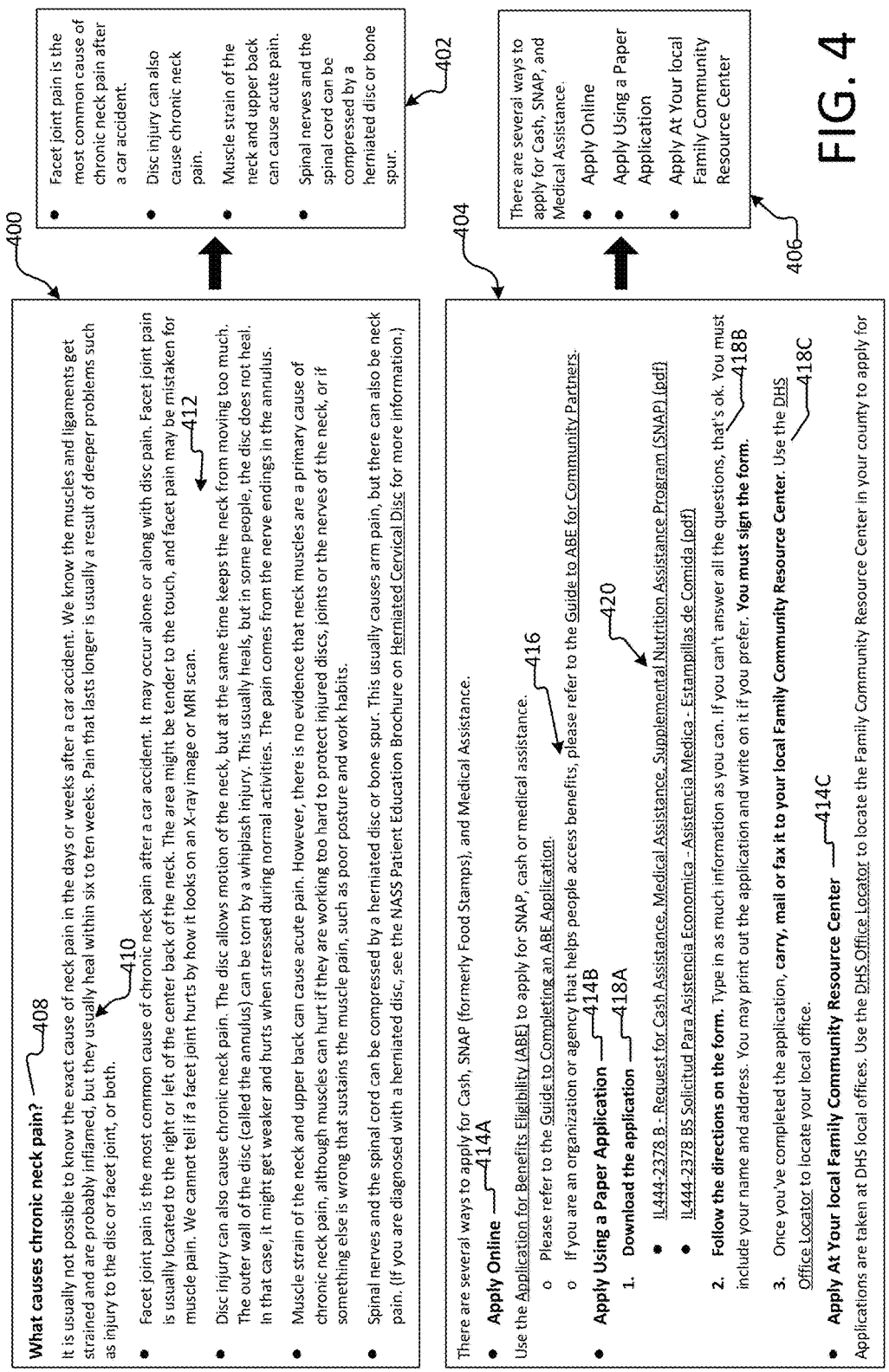
FIG. 4 illustrates a method for generating synthetic candidate passages for a document, according to an example embodiment.

FIG. 4 illustrates a method for generating synthetic candidate passages for a document, according to an example embodiment.

In addition to generating contiguous candidate passages using the sliding window approach described above, synthetic candidate passages may be generated by combining the text from various parts of a document into a single coherent candidate passage. For instance, synthetic candidate passages can be composed using one or more of the following processes: removing a header and combining text falling before and after the header; combining text surrounding graphical elements such as graphs, tables and images; summarizing and shortening a long list of text into a more concise list of text; shortening complex formatted text into condensed formatted text; and the like.

As illustrated by FIG. 4, the text of document 400 is organized based on a header 408, first and second traditional sentences 410, and a bulleted list 412. As shown, each bullet of the bulleted list 412 includes multiple sentences. In this case, a synthetic candidate passage 402 may be generated by summarizing and shortening long bulleted list 412 into a more concise bulleted list. As illustrated, synthetic candidate passage 402 was generated by extracting the first sentence of each bullet of the bulleted list 412 and combining these sentences into a more concise bulleted list.

In another example, the text of document 404 is organized in a hierarchical structure, including both bulleted and numerically listed information. For instance, document 404 includes primary bulleted information 414A, 414B, and 414C. Document 404 further includes secondary bulleted information 416 and secondary numerical information 418A, 418B, and 418C. Additionally, document 404 includes tertiary bulleted information 420. In this case, a synthetic candidate passage 406 may be generated by shortening the complex formatted text of document 404 into condensed formatted text. As illustrated, synthetic candidate passage 406 was generated by extracting the primary bulleted information 414A, 414B and 414C and combining these sentences into condensed formatted text.

As should be appreciated, FIG. 4 is described for purposes of illustrating the present methods and systems and is not intended to limit the disclosure to a particular sequence of steps, e.g., steps may be performed in differing order, additional steps may be performed, and disclosed steps may be excluded without departing from the present disclosure.

FIG. 5 illustrates an interface for displaying a summary of document, according to a first example embodiment.

As described above, the document summarization application may be configured to provide a near real-time summary of a document, e.g., document 502. In some aspects, an indication to summarize a document may be received when the document is accessed via a digital document application, a web browser, etc., and the document summarization application may automatically provide a summary of document 502. In other aspects, an indication to summarize a document may be received upon activating a control (e.g., icon, button, etc.) associated with the document summarization application. For instance, as illustrated by FIG. 5, upon launching document 502 via interface 500 (e.g., a web browser), a user may select icon 504 to view a summary of document 502. Icon 504 may be an extension of interface 500 (e.g., browser extension) associated with the document summarization application. In aspects, in response to receiving the indication to summarize document 502, the document summarization application may provide summary 506 in near real time to the user.

As detailed above, in response to receiving an indication to summarize document 502, the document summarization application may execute one or more processes including: parsing the document, extracting sentences from the document, generating candidate passages from the extracted sentences, extracting features associated with the generated candidate passages, ranking the generated candidate passages based at least in part on the extracted features, and generating a summary of the document based at least in part on the ranking.

For example, document summarization application may generate one or more sets of candidate passages based on document 502, as described above. After extracting features and generating feature vectors for each of the candidate passages, each candidate passage may be scored to identify the most important, representative and/or salient candidate passages for document 502. For example, a machine-learned passage classifier may be applied to candidate passages of document 502 so as to identify the most representative candidate passages for document 502 in near real time. In particular, the passage classifier may score each candidate passage based at least on the feature vector calculated for the candidate passage. Upon scoring each candidate passage (and removing any duplicate candidate passages), the highest-scoring candidate passages may be identified as important, representative, and/or salient portions of document 502.

As further illustrated by FIG. 5, high-scoring candidate passages may be presented as summary 506 for document 502. In some aspects, a set number of high-scoring candidate passages may be presented as summary 506, e.g., the top five candidate passages. In further aspects, additional high-scoring candidate passages may be displayed upon request, e.g., by selecting a "Show More" control 510. As should be appreciated, any suitable number of high-scoring candidate passages may be presented based on a preset rule or any suitable criteria.

According to some aspects, high-scoring candidate passages may be presented within summary 506 in the order in which they fall within document 502, regardless of a relative ranking between the high-scoring candidate passages. That is, a candidate passage that appears later in the document (e.g., a concluding paragraph) may be presented as the last candidate passage in the summary even if that candidate passage received the highest score among the other high-scoring candidate passages. Alternatively, according to other aspects, the high-scoring candidate passages may be presented within summary 506 in order of a relative ranking between the high-scoring candidate passages. That is, the highest scoring candidate passage may be presented first, then the second highest scoring candidate passage, and so on. In still further aspects, high-scoring candidate passages may be highlighted throughout the document but may not be displayed in a separate pane or window.

As illustrated by FIG. 5, summary 506 is presented in a pane or window adjacent to document 502. As shown, the pane displaying summary 506 is provided as an overlay that obstructs at least a portion of document 502 from view. In some aspects, when a user highlights one of the candidate passages in the summary 506, e.g., candidate passage 508A, display of the document may advance to the location of a corresponding candidate passage within document 502, e.g., candidate passage 508B. In further aspects, when candidate passage 508A is highlighted, the corresponding candidate passage 508B may be highlighted within document 502. As illustrated, high-scoring candidate passage 508A does not include the first sentence of document 502. In some aspects, as illustrated, high-scoring candidate passages my not be aligned with a sentence and/or paragraph structure of document 502. For instance, corresponding candidate passage 508B spans portions of two paragraphs within document 502. As detailed above, as candidate passages may be generated based on contiguous sentences within a document regardless of paragraph delineations and, thus, high-scoring candidate passages may not be aligned with the document structure.

The pane or window displaying summary 506 may also include a search control 512 and a search input field 514 for finding passages in document 502 based on a word or phrase. In this case, a user may advance through the document based on search terms entered into input field 514. In aspects, search terms may or may not be included within the summary 506. Even so, a user may advance through the document based on search terms entered into input field 514.

As should be appreciated, FIG. 5 is described for purposes of illustrating the present methods and systems and is not intended to limit the disclosure to a particular sequence of steps, e.g., steps may be performed in differing order, additional steps may be performed, and disclosed steps may be excluded without departing from the present disclosure.

FIG. 6 illustrates an interface for displaying a summary of document, according to a second example embodiment.

FIG. 6 illustrates document 602 displayed in an interface 600 (e.g., a web browser). As described above, the document summarization application may be configured to provide a summary of a document, e.g., document 602, in near real time. In some aspects, an indication to summarize document 602 may be received when the document is accessed and the document summarization application may automatically provide a summary of the document, as described above. In other aspects, an indication to summarize a document may be received upon selection of icon 604, which is provided as an extension of interface 600 (e.g., a browser extension), as described above. In aspects, in response to receiving the indication to summarize document 602, the document summarization application may provide summary 606 in near real time.

In aspects, document 602 is the same document as document 502; however, a different portion of document 602 is displayed in interface 600. Similarly, summary 606, which is a summary for document 602, is the same as summary 506, which is a summary for document 502. As shown, the pane displaying summary 606 is provided as an overlay that obstructs at least a portion of document 602 from view.

As illustrated by FIG. 6, candidate passage 610, which corresponds to candidate passage 508A of FIG. 5, is no longer highlighted. As such, the corresponding candidate passage in candidate passage 610 (i.e., corresponding candidate passage 508B of FIG. 5) is not displayed or highlighted in document 602. Rather, candidate passage 608A is highlighted within summary 606, advancing document 602 to the location of corresponding candidate passage 608B. As illustrated, corresponding candidate passage 608B comprises a portion of a paragraph that is highlighted within document 602. As explained above, high-scoring candidate passages may not be aligned with a sentence and/or paragraph structure of document 602, thus, candidate passage 608B spans a portion of a single paragraph within document 602.

As should be appreciated, FIG. 6 is described for purposes of illustrating the present methods and systems and is not intended to limit the disclosure to a particular sequence of steps, e.g., steps may be performed in differing order, additional steps may be performed, and disclosed steps may be excluded without departing from the present disclosure.

Figure 7:
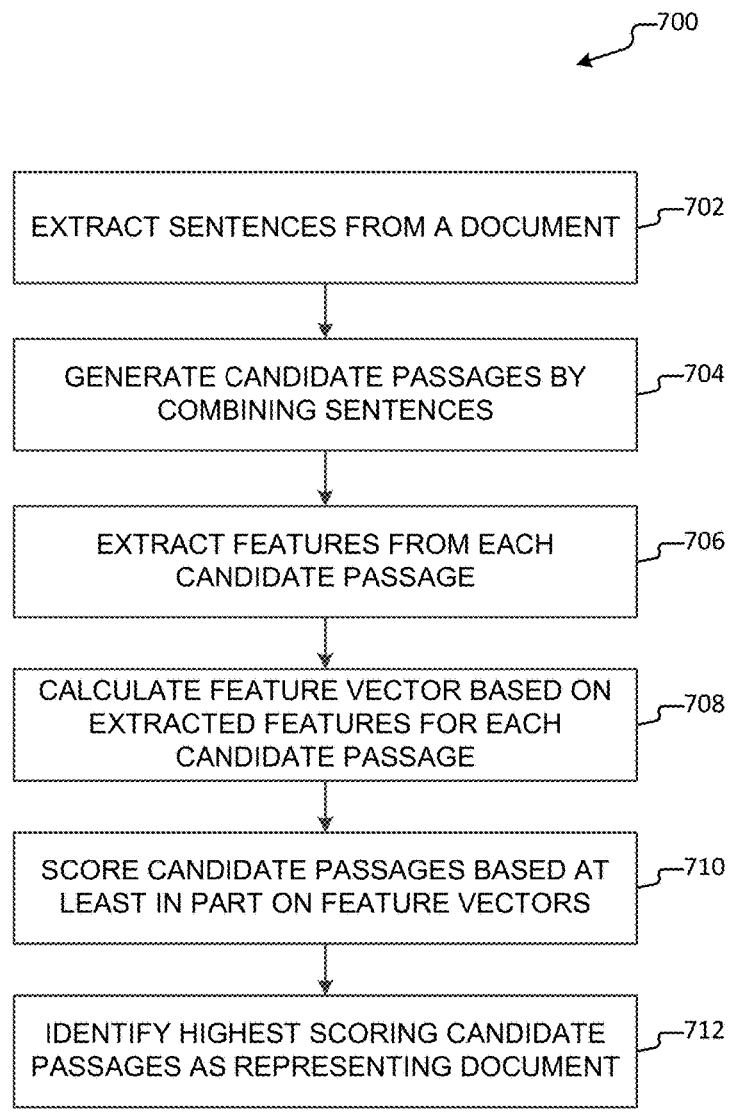
FIG. 7 illustrates a method for processing a document to generate a summary of the document, according to a first example embodiment.

FIG. 7 illustrates a method for processing a document to generate a summary of the document, according to a first example embodiment.

Method 700 begins with extract operation 702, where one or more sentences are extracted from a document by a document summarization application. In some aspects, the one or more sentences are extracted by one or more components of the document summarization application (e.g., sentence extractor 114). A sentence is defined as a unit of text that is separated from other units of text by delimiters (e.g., beginning and ending delimiters). In aspects, sentence extractor 114 identifies each sentence of the document and generates an ordered list of the sentences, e.g., S1, S2, S3, S4, etc. As described above, sentence extractor 114 may identify sentences based on any combination of beginning and ending, traditional and non-traditional delimiters.

At generate operation 704, one or more candidate passages are generated by combining the extracted sentences. In aspects, the one or more candidate passages are generated by one or more components of the document summarization application (e.g., passage generator 116). For instance, passage generator 116 may combine a series of sentences, S, into one or more candidate passages, P. In a first aspect, candidate passages may be generated using a sliding window approach, as illustrated by FIG. 3. The sliding window approach iteratively combines sequential sentences into a set of overlapping candidate passages. Candidate passages generated using this process may be referred to herein as "contiguous candidate passages." In addition to the contiguous candidate passages, synthetic candidate passages may be generated by combining the text from various parts of the document into a single coherent candidate passage. For instance, synthetic candidate passages can be generated using one or more of the following processes: removing a header and combining text falling before and after the header; combining text surrounding graphical elements such as graphs, tables and images; summarizing and shortening a long list of text into a more concise list of text; shortening complex formatted text into condensed formatted text; and the like.

At extract feature operation 706, features may be extracted for each of the one or more candidate passages. In aspects, the features are extracted from the one or more candidate passages by one or more components of the document summarization application (e.g., feature extractor 118). For instance, feature extractor 118 may extract various features that depict an importance of each candidate passage across several dimensions. Upon processing by the feature extractor 118, each candidate passage is represented by a feature vector that characterizes the candidate passage. For instance, features may include one or more of: "document-level features," "readability features," "presentation/layout features," "representativeness features" and "search metadata." In particular, document-level features help discriminate between the various candidate passages based on content characteristics of the document. Readability features indicate how "readable" (e.g., how complex) a specific candidate passage is and whether the candidate passage includes enough content (e.g., nouns, descriptive words) to be analyzed. Presentation/layout features describe a candidate passage in relation to structural aspects of the document. Representativeness features indicate how similar a candidate passage is to the entire document and, thus, may infer the relative importance of the candidate passage. Search metadata indicates whether words or phrases included in a candidate passage match historical search queries that returned the document.

At calculate feature vector operation 708, feature vectors for each of the one or more candidate passages may be calculated. In aspects, the features vectors are calculated by one or more components of the document summarization application (e.g., feature extractor 118). Upon processing by the feature extractor 118, each candidate passage is represented by a feature vector that characterizes the candidate passage.

At score operation 710, the one or more candidate passages are scored. For instance, the one or more candidate passages may be scored by one or more components of the document summarization application (e.g., passage ranker 120). The passage ranker 120 may utilize a machine-learned, gradient-boosted, decision tree-based classifier (e.g., passage classifier) may be developed and trained to discriminate between higher quality passages and perceivably lower quality passages. In particular, the passage ranker 120 may apply the passage classifier to the candidate passages generated for a particular document and score or rank each candidate passage based at least on the feature vector calculated for the candidate passage.

At identify operation 712, high-scoring candidate passages may be identified. In aspects, the high-scoring candidate passages may be identified by one or more components of the document summarization application (e.g., passage ranker 120 and/or summary generator 122). For instance, upon scoring each candidate passage (and removing any duplicate candidate passages), high-scoring candidate passages may be identified as important, representative, and/or salient portions of the document.

As should be appreciated, operations 702-712 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 8:
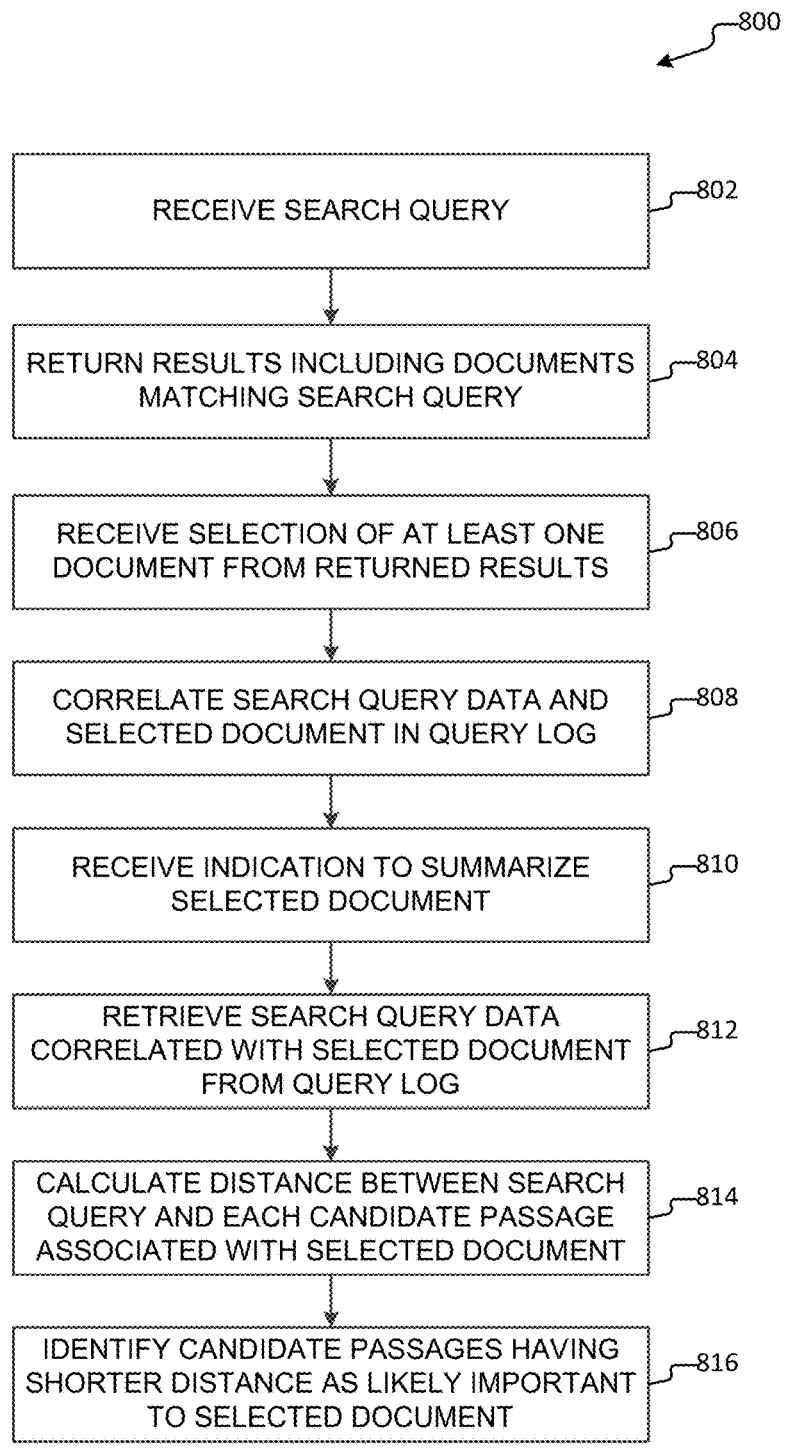
FIG. 8 illustrates a method for using historical search queries to identify important candidate passages, according to an example embodiment.

FIG. 8 illustrates a method for using historical search queries to identify important candidate passages, according to an example embodiment.

At receive operation 802, a search query may be received by a search engine. For instance, the search query may have been input by a user into a client computing device, routed through a network, and received by a server computing device implementing the search engine. Alternatively, the search query may have been a machine-generated query initiated by client computing device 104A or another client or server computing device. According to aspects, the term "search query" broadly refers to any request for information posed to the search engine.

At return results operation 804, the search engine may return one or more documents that match the search query. For instance, in response to receiving the search query, the search engine may parse the search query to identify search criteria (e.g., search keys), identify all documents in a document collection that match the search criteria (e.g., "candidate documents"), rank the candidate documents based on a predicted relevance to the search criteria, and return or present the results to the user beginning with the most relevant candidate document.

At receive selection operation 806, the search engine may receive a selection of one or more of the returned results. For instance, a user may select one or more documents of the returned results by clicking on a link and launching the selected document in a browser. Alternatively, a user may select a number of documents from the returned results by checking an input box adjacent to each of the presented results. As should be appreciated, a user may select one or more documents provided in the returned results by any suitable means.

At correlate operation 808, the search query is correlated with the one or more returned results and/or the one or more selected documents. In some aspects, the search engine may compile a query log that correlates the search query with the one or more returned results and/or the one or more selected documents. In some cases, the query log may be a "global" query log that stores information correlating a plurality of search queries with one or more documents in the document collection. For instance, a global query log may store correlations between search queries and returned and/or selected documents in an index, a table or a relational database. Alternatively, the query log may be an "individual" query log that is specific to a particular document and stores information regarding each search query that returned the particular document and/or resulted in the particular document being selected. An individual query log may store correlations between the particular document and each search query in an index, table, etc. As should be appreciated, additional or different analytics correlating one or more search queries to a document may be collected and stored in the query log.

At receive indication operation 810, an indication to summarize a document may be received. For example, an indication to summarize the document may be received when the document is accessed via a digital document application, a web browser, etc., and a document summarization application may automatically provide a summary of the document. In other aspects, an indication to summarize the document may be received upon selection of a control (e.g., icon, button, etc.) by a user. As detailed above, when an indication to summarize the document is received, the document may be processed in near real time to generate the summary. For example, the document may be parsed, sentences may be extracted from the document, and one or more candidate passages may be generated from the document. In at least some cases, the document to be summarized was previously selected based on one or more search queries.

At retrieve operation 812, search query data correlated with the selected document may be retrieved from a query log. In aspects, the search query data may correlate at least one search query with the selected document. That is, the search query data may include at least one search query that resulted in the selected document being launched from returned results. In aspects, the query log may be accessed by a pointer, reference, or otherwise, that is associated or appended to the selected document.

At calculate operation 814, a distance between the at least one search query and each candidate passage associated with the selected document may be calculated. That is, a similarity between each candidate passage and the at least one search query may be determined. In some aspects, the search query data may include a plurality of search queries that resulted in the selected document being launched from the results returned by each of the one or more search queries. In this case, a distance between each candidate passage and each search query of the one or more search queries may be calculated. Thereafter, multiple calculated distances may be averaged or otherwise combined for each candidate passage as an indication of the similarity between each candidate passage and the one or more search queries.

At identify operation 816, one or more candidate passages having a short distance (e.g., high similarity) to one or more search queries may be identified. In aspects, the more similar the candidate passage is to the one or more search queries that resulted in selection of the document, the more likely the candidate passage is important to and/or representative of the selected document. In some aspects, a distance to the at least one search query may be incorporated in a feature vector for each candidate passage.

As should be appreciated, operations 802-816 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 9:
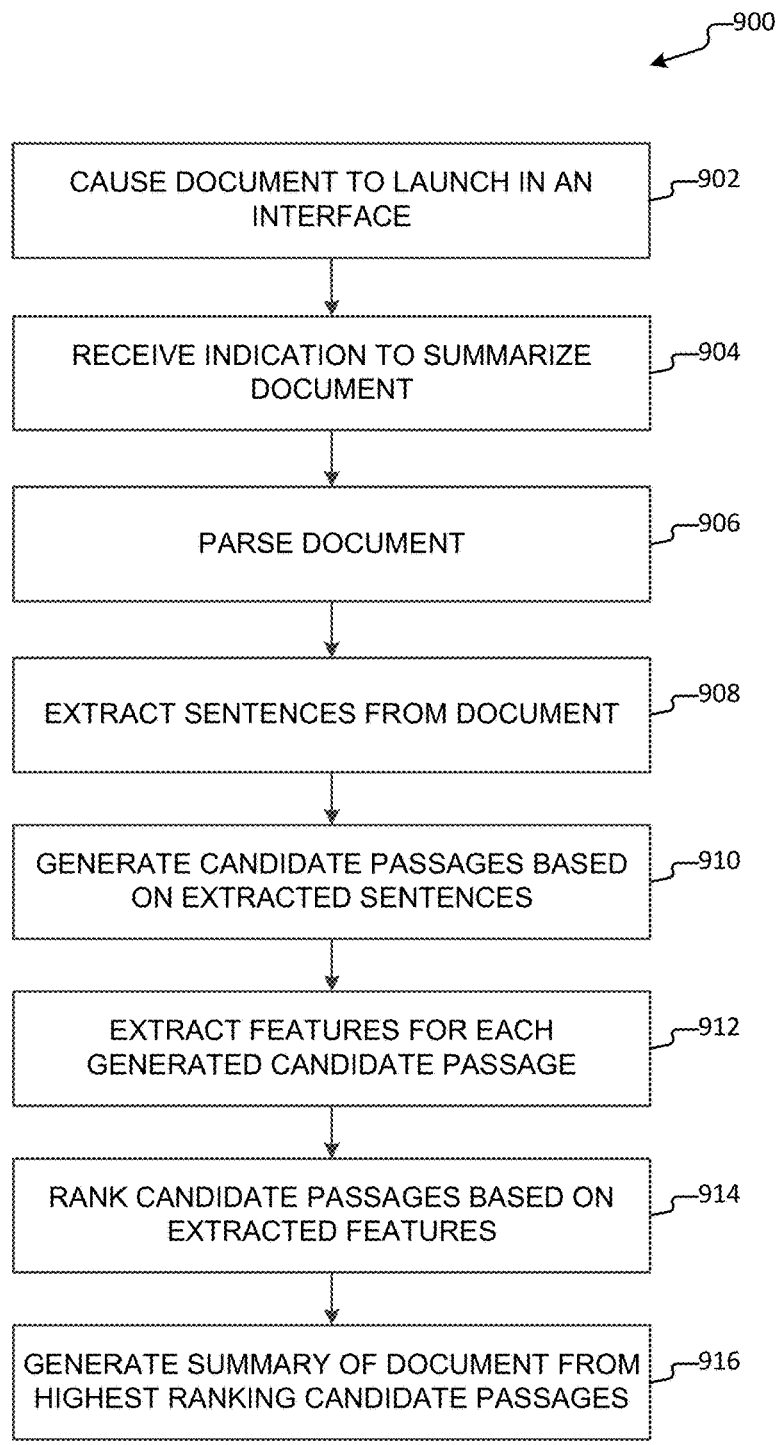
FIG. 9 illustrates a method for processing a document to generate a summary of the document, according to a second example embodiment.

FIG. 9 illustrates a method for processing a document to generate a summary of the document, according to a second example embodiment.

Method 900 begins with launch document operation 902, where a document is opened in an interface. For instance, the document may be opened in an interface associated with a digital document application, a web browser, etc. In some aspects, the document may be selected from a list of search results returned in response to a search query. In other aspects, the document may be launched by clicking or otherwise activating a hyperlink to the document, e.g., via an anchor included in another document. As should be appreciated, the document may be launched or opened within the interface via any suitable means. For example, the document may be included in a document collection available within a local or wide-area network and may be accessed via the network from a storage location. In some aspects, the network and associated computing devices and storage locations may be operated within a distributed computing environment (e.g., cloud computing environment).

At receive indication operation 904, an indication to summarize the document may be received. For example, an indication to summarize the document may be received when the document is accessed (e.g., opened, launched, etc.) and the document summarization application may automatically provide a summary of the document. In other aspects, an indication to summarize the document may be received upon selection of a control (e.g., icon, button, etc.) by a user.

At parse operation 906, a document parser may process the content and visual structure of the document to understand the content of the document. For example, the document may include linguistic aspects (e.g., word choice, grammar constructs, formal or informal language usage, and the like) and structural aspects (e.g., hierarchical structure, formatting, hyperlinked information, sentence structure, paragraph structure, outlining structure, organization, and the like). Thus, the document parser may identify one or more linguistic aspects and/or structural aspects for the document.

At extract operation 908, one or more sentences associated with the document may be extracted. A sentence is defined as a unit of text that is separated from other units of text by delimiters (e.g., beginning delimiters and ending delimiters). In aspects, a sentence extractor may identify each sentence of the document and generate an ordered list of the sentences, e.g., S1, S2, S3, S4, etc. Sentences may be identified based on detecting any combination of beginning and ending, traditional and non-traditional delimiters.

At generate operation 910, one or more candidate passages may be generated by combining the extracted sentences. For instance, candidate passages may be generated using a sliding window approach. The sliding window approach iteratively combines a series of sentences into a set of overlapping candidate passages. Candidate passages generated using this process may be referred to herein as "contiguous candidate passages." In addition to the contiguous candidate passages, synthetic candidate passages may be generated by combining the text from various parts of the document into a single coherent passage. For instance, synthetic candidate passages can be composed using one or more of the following processes: removing a header and combining text falling before and after the header; combining text surrounding graphical elements such as graphs, tables and images; summarizing and shortening a long list of text into a more concise list of text; shortening complex formatted text into condensed formatted text; and the like.

At extract feature operation 912, features may be extracted for each of the one or more candidate passages. Features may be extracted that depict an importance of each candidate passage across several dimensions. For instance, features may include one or more of: "document-level features," "readability features," "presentation/layout features," "representativeness features" and "search metadata."

At rank operation 914, the one or more candidate passages may be ranked. For instance, the one or more candidate passages may be ranked to identify the most important, representative and/or salient candidate passages for a document. For instance, a gradient-boosted, decision tree-based classifier (e.g., passage classifier) may be developed and trained to discriminate between higher quality passages and perceivably lower quality passages. In particular, the candidate passages may be ranked based on the extracted features for each candidate passage. For instance, upon ranking each candidate passage, high-ranking candidate passages may be identified as important, representative, and/or salient portions of the document.

At generate summary operation 916, a summary of the document may be generated. As used herein, a "summary" of a document is defined as one or more passages of the document that are extracted to concisely convey the main ideas of the document. In aspects, the high-ranking candidate passages identified at rank operation 914 as important, representative, and/or salient portions of the document may be presented in the summary. In some aspects, a set number of the high-ranking candidate passages may be presented in the summary. For instance, the top five high-ranking candidate passages may be provided as a summary for the document. As should be appreciated, any suitable number of the high-ranking candidate passages may be displayed based on a preset rule or any suitable criteria. Additional high-ranking candidate passages may be displayed upon request, e.g., by clicking a "Show More" control.

According to some aspects, high-ranking candidate passages may be presented within the summary in an order in which they fall within the document, regardless of a relative ranking between the high-ranking candidate passages. That is, a candidate passage that appears later in the document (e.g., concluding paragraph) may be presented as the last candidate passage in the summary even if that candidate passage received the highest rank among the other high-ranking candidate passages. Alternatively, according to other aspects, the high-ranking candidate passages may be presented within the summary in order of the relative ranking among the high-ranking candidate passages. That is, the highest ranking candidate passage may be presented first, then the second highest ranking candidate passage, and so on.

The summary may be provided in a ribbon, pane, or window adjacent to the document. In some aspects, the summary may be presented as an overlay over at least a portion of the document. In further aspects, when a user highlights one of the candidate passages in the summary, display of the document may advance to a location of the corresponding candidate passage within the document. The corresponding candidate passage may also be highlighted within the display of the document. In still other aspects, high-ranking candidate passages may not be displayed in a separate pane or window but may be highlighted throughout the display of the document. As should be appreciated, other methods and techniques of presenting a summary of the document are possible and the above examples are not intended to be limiting.

As should be appreciated, operations 902-916 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, as described herein.

Figure 10:
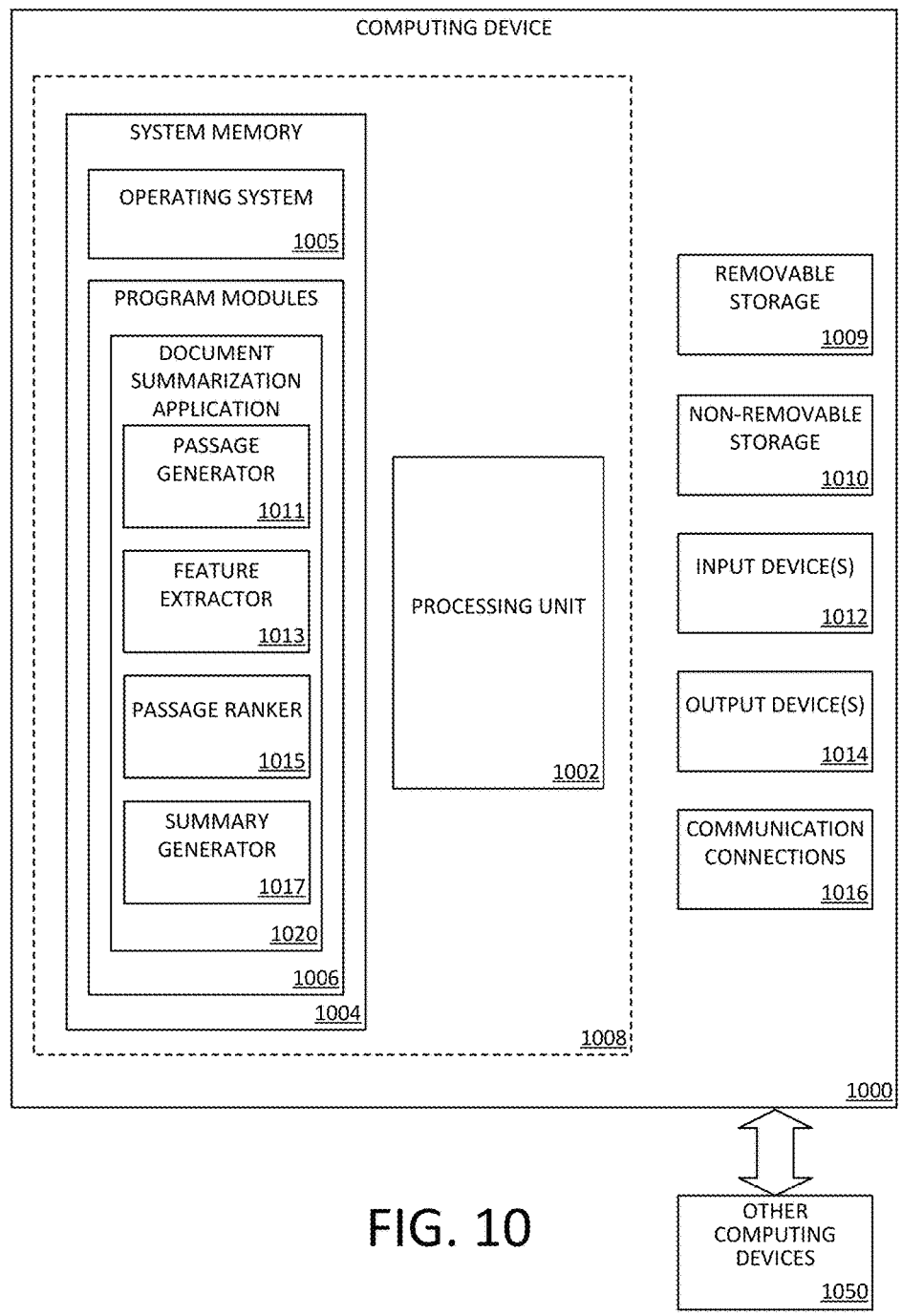
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a document summarization application 1020 on a computing device (e.g., server computing device 108), including computer executable instructions for document summarization application 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running document summarization application 1020, such as one or more components in regards to FIG. 1 and, in particular, passage generator 1011 (e.g., including document parser 112, sentence extractor 114, and/or passage generator 116), feature extractor 1013 (e.g., corresponding to feature extractor 118), passage ranker 1015 (e.g., corresponding to passage ranker 120), and/or summary generator 1017 (e.g., corresponding to summary generator 122).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., document summarization application 1020) may perform processes including, but not limited to, the aspects, as described herein. Other program modules that may be used in accordance with aspects of the present disclosure, and in particular for providing a document summary, may include passage generator 1011, feature extractor 1013, passage ranker 1015, and/or summary generator 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
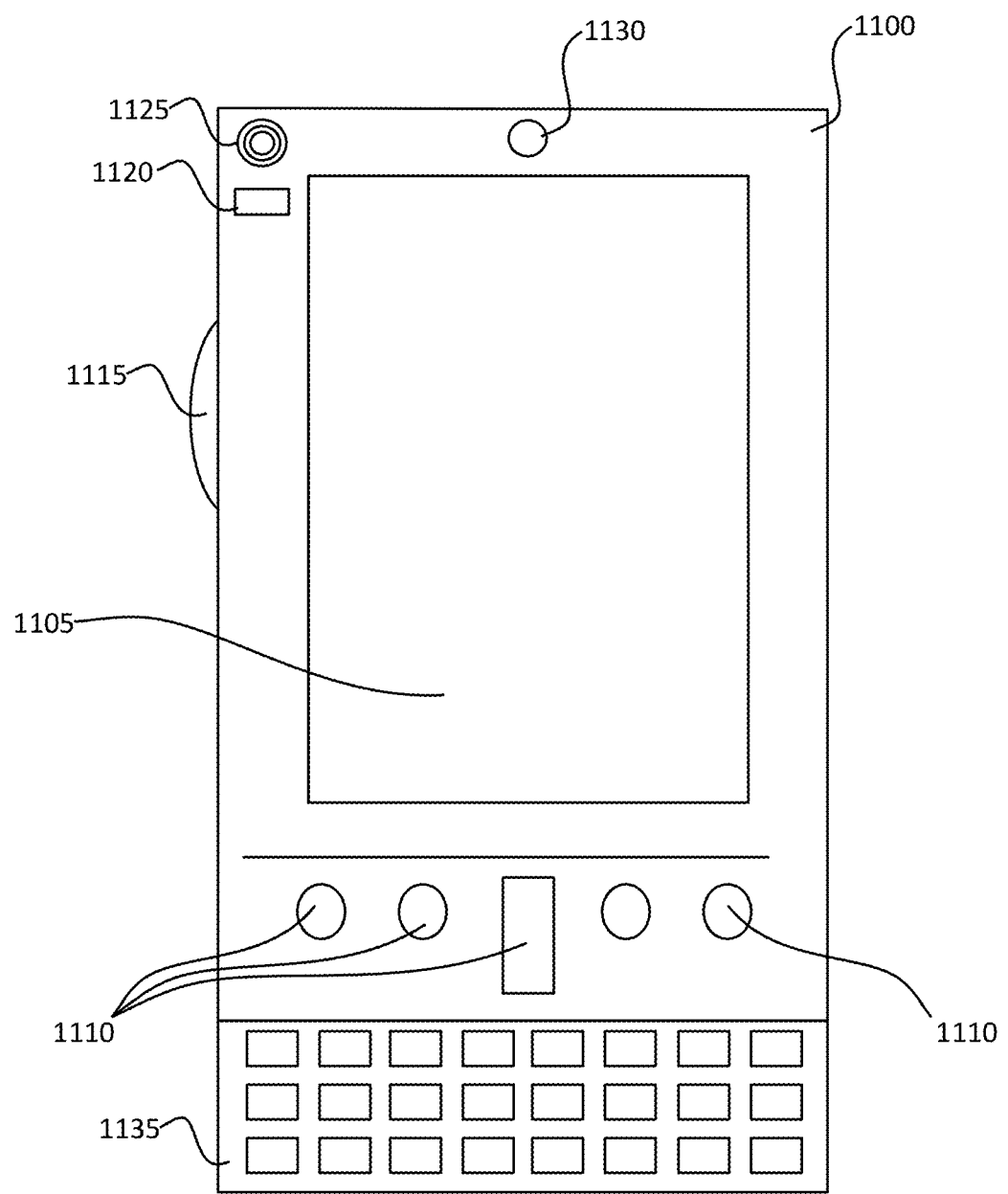
FIGS. 11A and 11B are simplified block diagrams of a mobile computing device with which aspects of the present disclosure may be practiced.
Figure 11B:
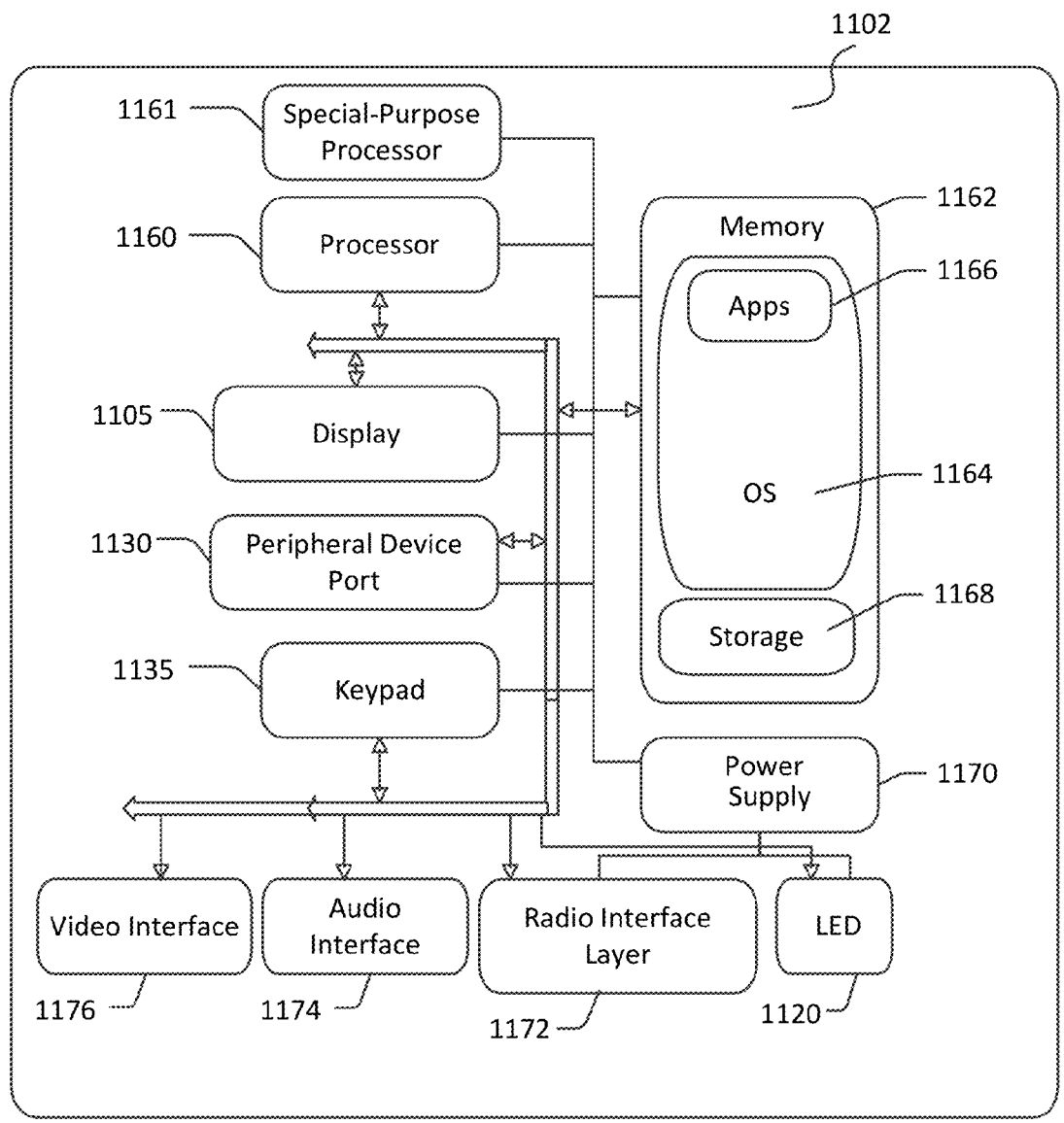

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing a document history interface as described herein (e.g., event tracker, linker component, temporal synchronizer, presentation component, etc.).

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and is not intended to limit the disclosure to a particular sequence of steps or a particular combination of hardware or software components.

Figure 12:
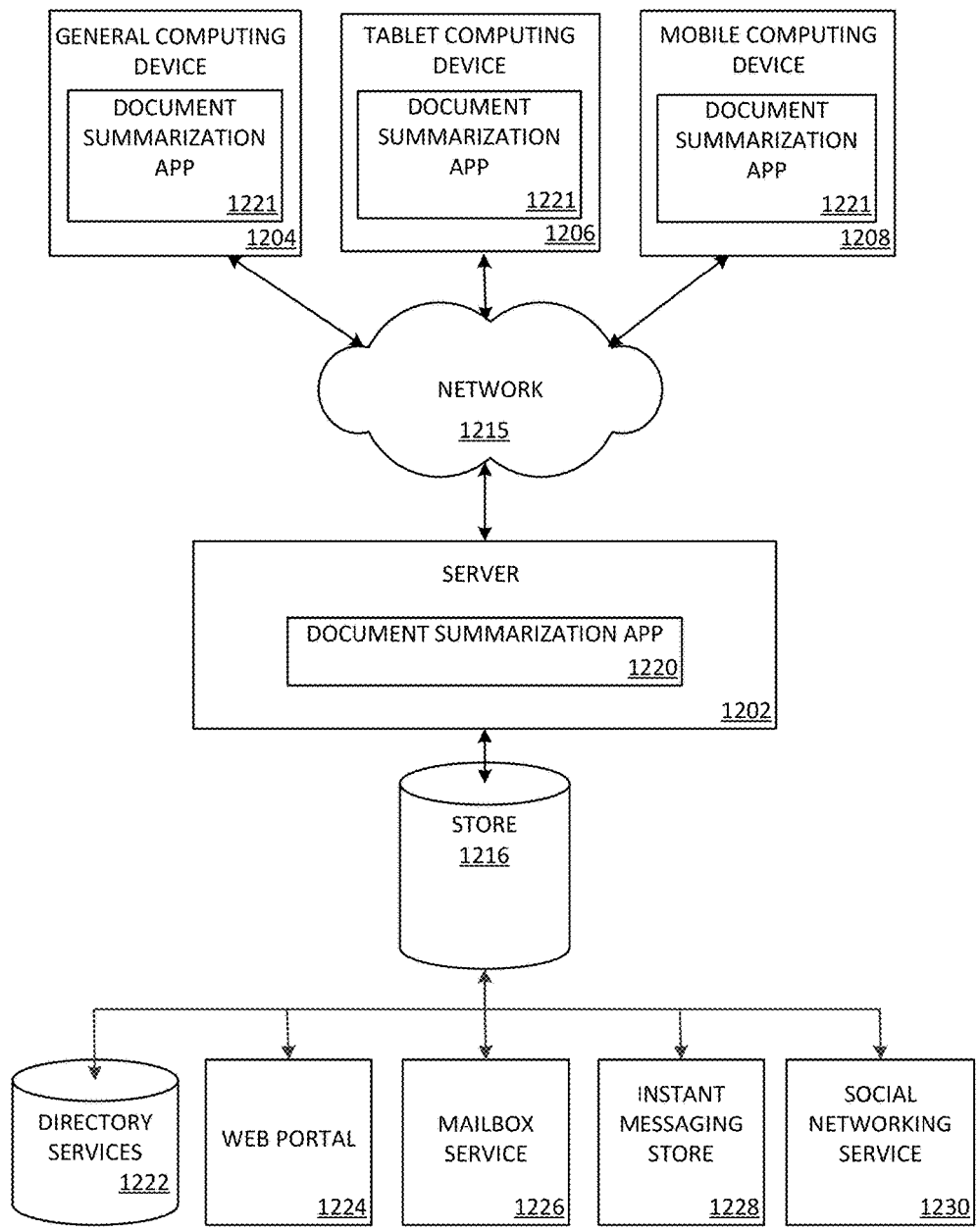
FIG. 12 is a simplified block diagram of a distributed computing system in which aspects of the present disclosure may be practiced.

FIG. 12 illustrates one aspect of the architecture of a system for processing data received at a computing system from a remote source, such as a general computing device 1204 (e.g., personal computer), tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking service 1230. The document summarization application 1221 may be employed by a client that communicates with server device 1202, and/or the document summarization application 1220 may be employed by server device 1202. The server device 1202 may provide data to and from a client computing device such as a general computing device 1204, a tablet computing device 1206 and/or a mobile computing device 1208 (e.g., a smart phone) through a network 1215. By way of example, the computer system described above with respect to FIGS. 1-11 may be embodied in a general computing device 1204 (e.g., personal computer), a tablet computing device 1206 and/or a mobile computing device 1208 (e.g., a smart phone). Any of these embodiments of the computing devices may obtain content from the store 1216, in addition to receiving graphical data useable to either be pre-processed at a graphic-originating system or post-processed at a receiving computing system.

As should be appreciated, FIG. 12 is described for purposes of illustrating the present methods and systems and is not intended to limit the disclosure to a particular sequence of steps or a particular combination of hardware or software components.

Figure 13:
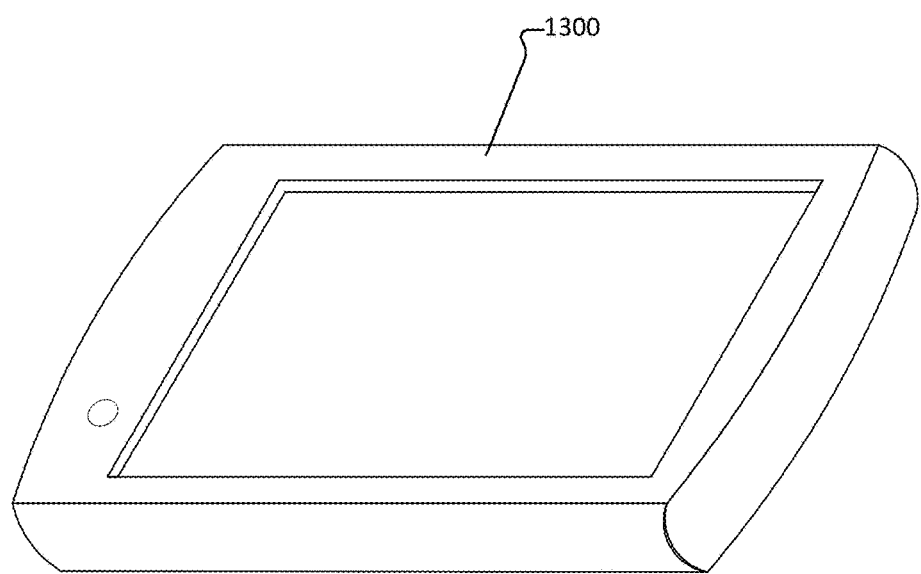
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 13 is described for purposes of illustrating the present methods and systems and is not intended to limit the disclosure to a particular sequence of steps or a particular combination of hardware or software components.

In a first aspect, a system is provided. The system includes a processing unit and a memory storing computer executable instructions that, when executed by the processing unit, cause the system to perform a method. The method may include causing a document to open in an interface and receiving an indication to summarize the document. The method further may include generating a plurality of candidate passages for the document and extracting one or more features for each candidate passage of the plurality of candidate passages. Additionally, the method may include ranking each candidate passage of the plurality of candidate passages based at least in part on the extracted one or more features and generating a summary of the document, where the summary may include at least the highest ranked candidate passage of the plurality of candidate passages. Additionally, the summary may be generated in near real time.

In further regard to the first aspect, the method may include generating the plurality of candidate passages based at least in part on an extracted plurality of sentences from the document and/or generating the plurality of candidate passages by iteratively combining a series of an extracted plurality of sentences. Additionally or alternatively, the method may include generating the plurality of candidate passages by one or more of: removing a document header and combining text falling before and after the document header; combining text surrounding a graphical element; summarizing a long list of text into a more concise list of text; and/or summarizing complex formatted text into condensed formatted text.

With further regard to the first aspect, the one or more features may include one or more of: document-level features, readability features, presentation/layout features, representativeness features and search metadata. Additionally or alternatively, the readability features may depict a relative complexity of each candidate passage and the readability features may include one or more of: passage meta features, lexical density features, type-token ratio features, and direct readability features. Additionally or alternatively, where extracting the one or more features may include: retrieving search query data, wherein the search query data correlates at least one search query with the document; calculating a distance between the at least one search query and each candidate passage of the plurality of candidate passages; and identifying one or more candidate passages having a short distance to the at least one search query as likely representative of the document.

The method may also include calculating a feature vector for each of the plurality of candidate passages based on the extracted one or more features and ranking each candidate passage of the plurality of candidate passages based at least in part on the calculated feature vector. Additionally or alternatively, the method may include calculating a feature vector for each of the plurality of candidate passages based at least in part on the distance between each candidate passage and the at least one search query and ranking each candidate passage of the plurality of candidate passages based at least in part on the calculated feature vector. In aspects, the calculated feature vector for a candidate passage may be representative of the extracted features for the candidate passage.

In a second aspect, a system is provided. The system includes a processing unit and a memory storing computer executable instructions that, when executed by the processing unit, cause the system to receive an indication to summarize a document and to generate a plurality of candidate passages for the document. The system further caused to extract one or more features for each candidate passage of the plurality of candidate passages and to score each candidate passage of the plurality of candidate passages based at least in part on the extracted one or more features. Additionally, the system caused to identify one or more high-scoring candidate passages of the plurality of candidate passages, where the high-scoring candidate passages are likely representative of the document. The second aspect further including any or all of the above-detailed elements of the first aspect.

In a third aspect, a method of summarizing a document is provided. The method includes causing a document to open in an interface and receiving an indication to summarize the document. The method further includes generating a plurality of candidate passages for the document and retrieving search query data, where the search query data correlates at least one search query with the document. Additionally, the method includes determining a similarity between the at least one search query and each candidate passage of the plurality of candidate passages. The method also includes identifying one or more candidate passages having high similarity to the at least one search query as likely representative of the document and generating a summary of the document including the one or more candidate passages identified as likely representative of the document. The third aspect further including any or all of the above-described elements of the first aspect.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform a method, the method comprising:
   causing a document to open in an interface;
   receiving an indication to summarize the document;
   generating a plurality of overlapping, contiguous candidate passages for the document, comprising:
   extracting a series of contiguous sentences; and
   iteratively combining in a consecutive order two or more of the series of contiguous sentences to generate at least a first candidate passage comprising a first extracted sentence and a second extracted sentence, at least a second candidate passage comprising the second extracted sentence and a third extracted sentence, and at least a third candidate passage comprising the third extracted sentence and a fourth extracted sentence;
   extracting one or more features for each candidate passage of the plurality of candidate passages;
   ranking each candidate passage of the plurality of candidate passages based at least in part on the extracted one or more features;
   generating a summary of the document, wherein the summary includes at least a highest ranked candidate passage of the plurality of candidate passages; and
   providing the summary adjacent to the document in the interface.

2. The system of claim 1, wherein the summary is generated in response to receiving the indication to summarize the document.

3. The system of claim 1, further comprising generating another plurality of candidate passages by one or more of:
   removing a document header and combining text falling before and after the document header;
   combining text surrounding a graphical element;
   summarizing a long list of text into a more concise list of text; and
   summarizing complex formatted text into condensed formatted text.

4. The system of claim 3, further comprising:
   generating a summary of the document, wherein the summary includes the highest similarity candidate passage of the plurality of candidate passages and at least one candidate passage of the one or more candidate passages.

5. The system of claim 1, wherein the one or more features comprise one or more of: document-level features, readability features, presentation/layout features, representativeness features and search metadata.

6. The system of claim 1, further comprising:
   calculating a feature vector for each of the plurality of candidate passages based on the extracted one or more features; and
   ranking each candidate passage of the plurality of candidate passages based at least in part on the calculated feature vector.

7. The system of claim 6, wherein the calculated feature vector for a candidate passage is representative of the extracted one or more features for the candidate passage.

8. The system of claim 1, wherein extracting the one or more features further comprises:
   retrieving search query data, wherein the search query data correlates at least one search query with the document;
   calculating a distance between the at least one search query and each candidate passage of the plurality of candidate passages; and
   identifying one or more candidate passages having a short distance to the at least one search query as representative of the document.

9. The system of claim 8, further comprising:
   calculating a feature vector for each of the plurality of candidate passages based at least in part on the distance between each candidate passage and the at least one search query; and
   ranking each candidate passage of the plurality of candidate passages based at least in part on the calculated feature vector.

10. The system of claim 1, wherein the one or more features comprise readability features that depict a relative complexity of each candidate passage, the readability features comprising one or more of: passage meta features, lexical density features, type-token ratio features, and direct readability features.

11. A system comprising at least one processing unit; and at least one memory storing computer executable instructions that, when executed by the at least one processing unit, cause the system to:
    receive an indication to summarize a document;
    generate a plurality of overlapping, contiguous candidate passages for the document, comprising:
    extract a series of contiguous sentences; and
    iteratively combine in a consecutive order two or more of the series of contiguous sentences to generate at least a first candidate passage comprising a first extracted sentence and a second extracted sentence, at least a second candidate passage comprising the second extracted sentence and a third extracted sentence, and at least a third candidate passage comprising the third extracted sentence and a fourth extracted sentence;
    extract one or more features for each candidate passage of the plurality of candidate passages;
    score each candidate passage of the plurality of candidate passages based at least in part on the extracted one or more features;
    identify one or more high-scoring candidate passages of the plurality of candidate passages, wherein the high-scoring candidate passages are considered representative of the document; and
    provide a summary of the document including at least a highest scored candidate passage adjacent to the document in the interface.

12. The system of claim 11, wherein identifying the one or more high-scoring candidate passages comprises highlighting the one or more high-scoring candidate passages within the document.

13. The system of claim 11, wherein identifying the one or more high-scoring candidate passages comprises generating a summary of the document, wherein the summary comprises the one or more high-scoring candidate passages in addition to the highest scored candidate passage.

14. The system of claim 13, wherein the summary is provided as an overlay covering at least a portion of the document.

15. The system of claim 11, wherein the indication to summarize the document is received when the document is caused to be opened.

16. The system of claim 11, wherein the indication to summarize the document is received in response to activation of a control.

17. The system of claim 11, the computer executable instructions further causing the system to:
retrieve search query data, wherein the search query data correlates at least one search query with the document;
calculate a distance between the at least one search query and each candidate passage of the plurality of candidate passages; and
identify one or more candidate passages having a short distance to the at least one search query as representative of the document.

18. The system of claim 17, the computer executable instructions further causing the system to:
calculate a feature vector for each of the plurality of candidate passages based at least in part on the distance between each candidate passage and the at least one search query; and
rank each candidate passage of the plurality of candidate passages based at least in part on the calculated feature vector.

19. The system of claim 11, wherein extracting the one or more features further comprises:
retrieving search query data, wherein the search query data correlates at least one search query with the document;
calculating a distance between the at least one search query and each candidate passage of the plurality of candidate passages; and
identifying one or more candidate passages having a short distance to the at least one search query as representative of the document.

20. A method of summarizing a document, the method comprising:
causing a document to open in an interface;
receiving an indication to summarize the document;
generating a plurality of candidate passages for the document, comprising:
extracting a series of contiguous sentences; and
iteratively combining in a consecutive order two or more of the series of contiguous sentences to generate at least a first candidate passage comprising a first extracted sentence and a second extracted sentence, at least a second candidate passage comprising the second extracted sentence and a third extracted sentence, and at least a third candidate passage comprising the third extracted sentence and a fourth extracted sentence;
retrieving search query data, wherein the search query data correlates at least one search query with the document;
determining a similarity between the at least one search query and each candidate passage of the plurality of candidate passages;
identifying one or more candidate passages having high similarity to the at least one search query as representative of the document;
generating a summary of the document including the one or more candidate passages identified as representative of the document; and
providing the summary adjacent to the document in the interface.

* * * * *